(12) United States Patent
    Huang

(10) Patent No.: US 10,730,034 B2
(45) Date of Patent: Aug. 4, 2020

(54) IRON-SELENIDE-OXIDE SORBENT COMPOSITION FOR REMOVING MERCURY (HG) VAPOR FROM A GASEOUS STREAM; METHODS OF USE AND METHODS OF MANUFACTURE

(71) Applicant: Viviron Technology LLC, Houston, TX (US)

(72) Inventor: Yongheng Huang, Houston, TX (US)

( * ) Notice: Subject to any disclaimer, the term of this patent is extended or adjusted under 35 U.S.C. 154(b) by 156 days.

(21) Appl. No.: 16/115,433

(22) Filed: Aug. 28, 2018

(65) Prior Publication Data

US 2019/0060862 A1   Feb. 28, 2019

Related U.S. Application Data

(60) Provisional application No. 62/551,006, filed on Aug. 28, 2017.

(51) Int. Cl.
    *B01J 20/06*  (2006.01)
    *B01J 20/28*  (2006.01)
    (Continued)

(52) U.S. Cl.
    CPC .............. *B01J 20/06* (2013.01); *B01D 53/64* (2013.01); *B01J 20/28004* (2013.01);
    (Continued)

(58) Field of Classification Search
    CPC .................. B01J 20/06; B01J 20/28004; B01J 20/28011; B01J 20/28016; B01J 20/3085; B01D 53/64
    See application file for complete search history.

(56) References Cited

U.S. PATENT DOCUMENTS 3,194,629 A   7/1965 Dreibelbis et al.
4,500,327 A   2/1985 Nishino et al.
(Continued)

FOREIGN PATENT DOCUMENTS

CN    102553528 B    7/2012
WO    2017075422     5/2017

OTHER PUBLICATIONS

Butz, J.R., Broderick, T.E., and Turchi, C.S. (2006) Amended Silicates™ for Mercury Control Project Final Report, DoE Award No. DE-FC26-04NT41988, Department of Energy.
(Continued)

*Primary Examiner* — Melvin C. Mayes
*Assistant Examiner* — Michael Forrest
(74) *Attorney, Agent, or Firm* — Gordon G. Waggett, P.C.

(57) ABSTRACT

A powdered Iron-Selenide-Oxide sorbent composition, a method of using the sorbent, and a method for producing the sorbent is disclosed for removing mercury vapor from a gaseous stream. The exact ratios of Fe to Se are varied. The method for producing the sorbent comprises the steps of: preparing a base ferrous or ferric oxide ($FeO_x$) media, conditioning the $FeO_x$ media with a slurry of ferrous selenite ($FeSeO_3$)/ferrous selenate ($FeSeO_4$), reducing the $FeSeO_3$/$FeSeO_4$ mixture by an elemental iron ($Fe^0$) powder to incorporate selenide into the slurry, and dewatering and oxidizing the slurry. The sorbent can be used alone (or in combination with a powdered activated carbon material or an inert powdered material) by direct injection into the Hg-containing gas stream, by coating of a filter fabric used in bag house with the sorbent, or by using the sorbent in a packed bed gas stream filtration system.

37 Claims, 18 Drawing Sheets

(51) Int. Cl.
    *B01D 53/64*     (2006.01)
    *B01J 20/30*     (2006.01)
    *B01D 53/82*     (2006.01)
    *B01D 53/83*     (2006.01)

(52) U.S. Cl.
    CPC ... *B01J 20/28011* (2013.01); *B01J 20/28016* (2013.01); *B01J 20/3085* (2013.01); *B01D 53/82* (2013.01); *B01D 53/83* (2013.01); *B01D 2253/1124* (2013.01); *B01D 2257/602* (2013.01); *B01J 20/3035* (2013.01); *B01J 20/3071* (2013.01); *B01J 2220/4806* (2013.01)

(56) References Cited

U.S. PATENT DOCUMENTS

| | | | |
|---|---|---|---|
| 7,906,027 | B2 | 3/2011 | Cross et al. |
| 8,440,585 | B2 | 5/2013 | Olson et al. |
| 8,834,606 | B2 | 9/2014 | Pollack |
| 9,073,008 | B2 | 7/2015 | McCullough et al. |
| 9,346,079 | B2 | 5/2016 | Lee et al. |
| 9,636,623 | B2 | 5/2017 | Kula et al. |
| 2006/0205591 | A1 | 9/2006 | Lee et al. |
| 2007/0092418 | A1 | 4/2007 | Maudlin et al. |
| 2011/0296991 | A1* | 12/2011 | Hughes ............ B01D 15/02 95/134 |
| 2012/0018384 | A1 | 1/2012 | Sawyer |
| 2012/0135214 | A1 | 5/2012 | Dawes et al. |
| 2012/0273431 | A1 | 11/2012 | Huang |
| 2014/0252270 | A1* | 9/2014 | Lehman, Jr. ......... B01D 53/02 252/182.33 |
| 2015/0283500 | A1 | 10/2015 | Butz et al. |
| 2017/0056818 | A1 | 3/2017 | Meyer et al. |

OTHER PUBLICATIONS

KIPO PCT notification of transmittal of ISR and WO, dated Dec. 20, 2018, 2 pages, PCT counterpart to current application.
KIPO PCT ISR International Search Report, dated Dec. 30, 2018, 3 pages, PCT counterpart to current application.
KIPO PCT Written Opinion, dated Dec. 20, 2018, 4 pages, PCT counterpart to current application.
ADA Carbon Solutions, Inc., website screenshots from www . ada-es . com., Copyright date 2016, last visited Jun. 6, 2017, 23 Pages.
Cabot Corporation, "Mercury Removal", website article, www . cabotcorp . com, last visited Jun. 6, 2017. 7 pages.
Chen, et al. (1996) "Mercury removal from combustion flue gas by activated carbon injection: mass transfer effects", vol. 41, No. 1. The 211th ACS National Meeting, New Orleans, LA, pp. 442-446.
Hussain, et al., "Fabrication, characterization and applications of iron selenide", J. Solid State Chemistry (Elsevier), vol. 243, Nov. 2016, pp. 179-189 (Abstract only).
Han, et al., "Application of spent H2S scavenger of iron oxide in mercury capture from flue gas", Ind. Eng. Chem. Res. 2016, 55, 17, 5100-5107 (Abstract Only).
Brown, et al., "Mercury removal from water by iron sulfide minerals. An electron spectroscopy for chemical analysis (ESCA) study", Environ. Sci. Technol. 1979, 13, 9, 1142-1144 (First Page only in lieu of Abstract).
Zhang, et al., "Adsorptive selenite removal from water using iron-coated GAC adsorbents", Water Research (Elsevier), Vo. 42, Issue 14 (Aug. 2008) pp. 3809-03816 (Abstract only).
Akhtar, et al., "Synthesis of iron selenide nanocrystals and thin films from bis (tetraisopropyldiselenoimidodiphosphinato)iron(II) and bis(tetraphenyldiselenoimidodiphosphinato)iron(II) complexes", J. Mater. Chem. A, 2014, 2, 20612-20620.
Siefers, A novel and cost-effective hydrogen sulfide removal technology using tire derived rubber particles, Thesis, Iowa State University Digital Repository (2010). https://lib.dr.iastate.edu/cgi/viewcontent.cgi?referer=&httpsredir=1&article=2291&context=etd.

\* cited by examiner

US 10,730,034 B2

IRON-SELENIDE-OXIDE SORBENT COMPOSITION FOR REMOVING MERCURY (HG) VAPOR FROM A GASEOUS STREAM; METHODS OF USE AND METHODS OF MANUFACTURE

CROSS-REFERENCE TO RELATED APPLICATIONS

This application claims the benefit of the filing date of and priority to: U.S. Provisional Application Ser. No. 62/551,006 entitled "Iron-Selenide-Oxide Sorbent Composition for Removing Mercury (Hg) Vapor from a Gaseous stream; Methods of Use and Methods of Manufacture" and filed Aug. 28, 2017, Confirmation No. 4234; said provisional application is incorporated by reference herein in its entirety for all purposes.

COPYRIGHT AUTHORIZATION

©2017 Viviron Technology LLC. A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND OF THE INVENTION

Field of the Invention

The present disclosure relates generally to the field of sorbent compositions for removing mercury (Hg) vapor from gaseous streams, and a method of manufacturing and using the same.

Mercury is a potent neurotoxin that can affect living organisms, even at very lower concentrations. Generally, the emission of mercury in the gaseous stream from the electric generation plants, industrial boilers, waste incinerators, cement production kilns, has become a major environmental concern. The largest source of mercury emission is from coal-fired or oil-fired power plants. The mercury emission is present predominantly in the flue gas or exhaust gas stream from the burning carbonaceous material such as coal. In the US, mercury emission is regulated by the Mercury and Air Toxic Standards (or "MATS") enacted by the U.S. EPA in 2011, which is effected in 2015. In 2013, the United Nations Environmental Programme has successfully completed the negotiations towards producing a "Global legally binding instrument on mercury", known as the Minamata Convention. Most of the industrialized countries, including, USA, and EU, are the signature countries of the Minamata Convention.

The most common and established method for mercury emissions reduction from coal-fired and oil-fired power plants is the injection of powdered activated carbon (PAC), or bromine-impregnated PAC which is more effective, into the flue stream. The activated carbon provides a high specific surface area bearing various surface functional sites for the adsorption of the mercury and the agglomeration of the particle bound mercury. The method is effective in general, but rather costly as the quantities of carbon usage are large, and the injection process requires attention in operation. In addition, the mass ratio of $Hg^0$ and $Hg^{2+}$ or $^{1+}$ in the contaminated gas stream may change frequently in many real applications. Such variation and uncertainty could pose a major challenge to conventional PAC applications for achieving a consistent result in mercury removal.

While using PAC for Hg removal, the captured Hg is bound onto the surface of the spent PAC. Such binding of Hg with the carbon surface is often not permanent and could be reversed under certain conditions. Under heat treatment, Hg on the sorbent could be easily released into the environment, leading to contaminations to water, air, or soils. Further, the disadvantage of adding activated carbon into the flue stream is the retention of the activated carbon in the fly ash waste stream. Fly ash from coal-fired power plants is often sold to cement plants, which is used as an additive to make concrete. The presence of the activated carbon in the fly ash may adversely affect its quality as a concrete additive. The fly ash contaminated with elevated concentrations of activated carbon may not be sellable, thus it has to be landfilled at a cost.

Another method for reducing Hg emissions is through the addition of powdered sulfur, or selenium compounds, which reacts with the emitted mercury to adsorb. Dawes et al., U.S. Pat. App. Pub. No. 20120135214 discloses active materials such as metal sulfide or metal selenide which may be useful in the removal of a contaminant from a fluid. Butz et al., U.S. Pat. App. Pub. No. 20150283500 discloses a solution-based mercury capture system and method that includes the equipment for and the production of a mercury-sorbent metal sulfide in a flue gas conduit of a coal fired power plant. The system includes transition metal salt solution injection and sulfur solution injection apparatus that could introduce transition metal salt solution and sulfur solution droplets into the flue gas stream. The method includes the introduction of a copper salt, an iron salt, and a sulfur compound into the flue gas stream, wherein the mercury-sorbent metal sulfide can be manufactured and reacted with mercury in the flue gas. Similar products and technologies include the one developed by Novinda Inc. that uses silicate substrates amended with metal sulfides for dry sorbent injection application to remove mercury vapor from the flue stream. See Butz, J. R., Broderick, T. E., and Turchi, C. S. (2006) Amended Silicates™ for Mercury Control Project Final Report, DoE Award Number DE-FC26-04NT41988, Department of Energy. However, it appears that all these non-carbon sorbent technologies could not compete with the Br-PAC based technology for various reasons (mainly performance) and as such are commercially unsuccessful to date.

Sawyer, U.S. Pat. App. Pub. No. 20120018384 discloses a method of removing mercury from water. The method includes depositing selenium or a reactive selenium compound on a support structure, such as reticulated foam. The support structure is then placed in contact with mercury laden water whereby allowing the selenium and the mercury in the water to react. The selenium deposited support structure retains the mercury thereby removing the mercury from the mercury laden water.

There is still an ongoing need to provide improved pollution control and pollution control sorbents. In this regard, simple and environmentally friendly methods that effectively remove mercury from flue gas and are capable of being implemented in existing coal fired power plants are needed.

SUMMARY OF INVENTION

The present invention addresses these needs by providing a new sorbent or sorbent composition (sometimes also referred to as "V-Sorbent"), method of using the said sorbent, and a method for producing the sorbent for removing mercury vapor from a gaseous stream. In an embodiment, the sorbent composition comprises a chemical compound of iron (Fe) and selenium (Se), where the exact ratio of the Fe is varied. In one embodiment, the bulk density of the chemical compound is 1.46 g/cm$^3$. In one embodiment, the crystalline size of the chemical compound ranges from about 20 nm to about 200 nm. In some embodiments, the general formula for the chemical compound is $Fe^{(III)}{}_a Fe^{(II)}{}_b Se^{(-II)}{}_x O^{(-II)}{}_y$, wherein the ratio of a to b (a:b) depends on the oxidation process, and the value of x depends on the amount of the selenium. In one embodiment, the sorbent composition by weight comprises iron (Fe) ranging from about 60% to about 70%, selenium (Se) ranging from about 2% to about 10%, and oxygen (O) ranging from about 20% to about 30%.

In one embodiment, the method for producing the chemical compound comprises the steps of: (a) preparing a base ferrous or ferric oxide (FeO$_x$) media and forming non-stoichiometric mixed Fe(II)-Fe(III) iron oxide; (b) conditioning the base FeO$_x$ media with a slurry of ferrous selenite (FeSeO$_3$)/ferrous selenate (FeSeO$_4$); (c) reducing the FeSeO$_3$/FeSeO$_4$ mixture by an elemental iron (Fe$^0$) powder and incorporating a selenide into the slurry; and (d) dewatering and oxidizing the slurry to produce the sorbent composition for removing mercury vapor from a gaseous stream.

In some embodiments, the ratio of Fe(III) to Fe(II) at step (a) is 1.0:0.5. In one embodiment, the formula of the product at step (a) is approximated to $Fe^{(III)}{}_{1.0} Fe^{(II)}{}_{0.7} O^{(-II)}{}_{2.2}$. In some embodiments, the pH at the end of conditioning in step (b) ranges between about 9.0 and about 9.5. In one embodiment, the formula of the product at step (c) is approximated to $Fe^{(III)}{}_{1.0} Fe^{(II)}{}_{2.5} Se(-II)_{0.366} O^{(-II)}{}_{3.63}$. In one embodiment, the step (d) comprises washing the slurry produced from step (c) to remove salts. In some embodiments, the washing process is accomplished through one or more cycles of settling, supernatant decanting or deionized (DI) water rinsing. In some embodiments, the washing process is performed through filter pressing the slurry, and decanting or deionized (DI) water rinsing. In one embodiment, step (d) of the method further comprises drying the washed slurry to produce the powdered sorbent composition. In some embodiments, the drying process is performed using an oven or a spray dryer.

Methods to Apply the New Sorbent Media to Capture Mercury

In an embodiment, the sorbent could be used by direct injection of powdered sorbent, direct injection of mixed sorbent and powdered activated carbon (PAC), direct injection of mixed sorbent and inert particles, coating of fabric used in bag house with sorbent, and packed bed filtration.

The new sorbent's fast sorption/reaction rate, high capacity, chemical robustness and stability of Hg removal enable various flexible uses of the new sorbent in removing mercury vapor from a gaseous stream. Exemplary methods of using the sorbent composition for removing mercury vapor from a gaseous stream are disclosed. In one embodiment, the method comprises direct injection of the powdered sorbent composition into the ductwork for the gaseous stream to capture mercury in flight. The composition could be applied upstream of the particulate matter device such as an electrostatic precipitator (ESP) or a fabric filtration baghouse. Because of the extremely high capacity and efficiency of the new sorbent or sorbent composition, the required application rate for the sorbent could be much lower than that of conventional PAC or Br-PAC. For example, an application rate equivalent to 1 percent of current PAC injection rate might be sufficient. In this case, a relatively small injection and sorbent storage system will be sufficient. With reduced injection system and injection rate, the system capital cost and sorbent cost could be significantly lowered.

In another embodiment, the method comprises direct injection of a mixture of the new sorbent or sorbent composition and a PAC powder into the ductwork for a gaseous stream to capture mercury in flight. Similarly, the sorbent/PAC mixture could be applied upstream of the particulate matter control unit. The use of a mixture of the new sorbent with conventional PAC media may have the added advantage of adding to the PAC's sorption capacity. In one such mixture, the combined media may contain 0.5-10% of the new sorbent with the rest comprising PAC. One advantage of using the mixed media is that the mixed media will have similar physical properties to that of PAC. Thus, the media could be used without a need to modify the existing PAC application apparatus. Currently, many coal-fired power plants in the US have installed PAC injection based Hg control technology. Thus, such mixture of new sorbent and PAC could be easily implemented.

In another embodiment, the method comprises direct injection of the new sorbent mixed with inert particles. The inert media could be chosen from various sources. For example, certain clay powders, pulverized iron ores, diatom earth, or even the fly ash. For dry powder injection applications, the contact time between the new sorbent crystalline with the flue gas is limited to no more than a few seconds. In one embodiment, the sorbent comprises a particle size of about 1 to about 10 μm, consisting of numerous nano-scale size crystalline particles in large aggregates. Thus the large Hg removal capacity is mostly unused in the application. One way to increase the use efficiency of the new sorbent capacity is to make the sorbent particle size as small and dispersed as possible, preferably in sub-micron sizes. The extra fine sorbent particles could then be coated on the larger inert particles, essentially using the larger inert particles (e.g., 10 μm) as the sorbent carrier. Direct use of sub-micron sorbent might pose a challenge to the particulate matter collector such as the ESP. With the sub-micron V-sorbent coated on a larger particle, the injected media would not pose a problem to the down-stream treatment processes.

In another embodiment, the method comprises coating of a fabric or filter bag of a baghouse with the new sorbent composition. For a coal-fired power plant equipped with a fabric filtration baghouse, the sorbent media could be coated on the fabric filtration bag. In a typical baghouse, several thousands of filter bags are installed with a total area of thousands of square meters. In a laboratory trial, submerging/coating the filter bag directly into the wet sorbent slurry, and then drying it could naturally place a rather uniform layer of sorbent media on the fabric structure. It is estimated that 200 g of the new sorbent could be emplaced on 1 m$^2$ fabric. The fabric typically has a thickness of about 2-3 mm. For a typical baghouse operation, the treated gas flows through the fabric at a rate of about 1 cm/sec. As such, the new sorbent media has about 0.1-1 second contact time. The reaction time is short, but based on column filtration tests, a contact time of 0.1 second is sufficient to remove over 99% Hg as discussed further in the laboratory result section. For a bag house with 10,000 m$^2$ filtration fabric area, 2000 kg of the new sorbent could be loaded onto the fabric bag in the system. This would be sufficient to remove 400 kg Hg. For a mid-size power plant (e.g., 300 MW), the annual Hg removal is in the order of 10 or 100 kilogram. Therefore, a bag house loaded with 2000 kg of the new sorbent would be sufficient for Hg removal for at least one year, potentially multiple years.

In yet another embodiment, the method comprises one or more filtration beds packed with the sorbent composition. In this packed bed filtration example, a filtration structure could be installed within the flue-gas treatment system. Preferably, it would be installed downstream of the particulate matter removal system such as ESP or baghouse to avoid the potential interferences of fly ash particles, such as surface deposition or pore clogging. In some embodiments, the sorbent could be installed within the wet scrubber or in the stack. The design contact time could be as low as 1 second. As such, the size of the mercury filtration bed could be relatively small. Due to the large sorption capacity of the new sorbent, it is possible that the Hg filtration bed could last many years before a need to replenish or replace the sorbent media. The packed bed should have a high porosity and low flow resistivity.

In one embodiment, there is disclosed a method for producing an Iron-Selenide-Oxide sorbent composition for removing mercury vapor from a gaseous stream, comprising the steps of: A. preparing in a reaction vessel employing a combination of mixing and aeration a base ferrous or ferric oxide ($FeO_x$) media comprising a non-stoichiometric mixed Fe(II)-Fe(III) iron oxide, the $FeO_x$ media having a lattice structure, B. conditioning the base $FeO_x$ media formed in Step A by mixing it into a aqueous slurry of ferrous selenite ($FeSeO_3$) and ferrous selenate ($FeSeO_4$) in a conditioning reactor to form a conditioned mixture, C. reducing the conditioned mixture formed in Step B by mixing an elemental iron ($Fe^0$). powder into the conditioned mixture to result in the incorporating of the selenide into the $FeO_x$ media lattice to create a slurry comprising a mixed $Fe^{(II)}/Fe^{(III)}$—$Se^{(-II)}$—$O^{(-II)}$ crystalline structural material, and D. dewatering and oxidizing the Fe—Se—O material to produce the sorbent composition in a powdered form. In this method, Step A may further comprise mixing deionized water, $FeCl_2.4H_2O$, and NaOH to form a precipitate per the reaction: $Fe^{2+}+OH^-\rightarrow Fe(OH)_2$ precipitate, wherein the initial stage of the mixture comprises a pH of about 11.80 and a mostly white colored precipitate, and wherein the aeration is moderated to drive an oxidation reaction to form a mostly black precipitate known as magnetite ($Fe_3O_4$) or maghemite ($\gamma$-$Fe_2O_3$) or a mixture of both, following the equations: (1) $6Fe(OH)_2+O_2\rightarrow 2Fe_3O_4+6H_2O$; or (2) $4Fe(OH)_2+O_2\rightarrow 2Fe_2O_3+4H_2O$. In one embodiment, the ratio of Fe(III) to Fe(II) is 1.0:0.5 at Step A. In one embodiment, the mixed Fe(II)-Fe(III) iron oxide at Step A comprises $Fe^{(III)}_{1.0}Fe^{(II)}_{0.7}O^{(-II)}_{2.2}$.

The conditioning reactor in the conditioning Step B may have an internal headspace that is flushed with and maintained under an inert gas to create an oxygen-free environment. In one embodiment, the pH at the end of conditioning Step B is between 9.0 and 9.5. In one embodiment, the Fe—Se—O crystalline structural material formed in Step C comprises $Fe^{(III)}_{1.0}Fe^{(II)}_{2.5}Se^{(-II)}_{0.366}O^{(-II)}_{3.63}$. In one embodiment, the slurry formed in Step C further comprises salt residues, and Step D further comprises washing the slurry produced from Step C to remove the salt residues. The washing may comprise one or more cycles of settling, supernatant decanting or deionized (DI) water rinsing. The washing may also comprise filter pressing the slurry, decanting or deionized (DI) water rinsing. In one embodiment, Step D further comprises drying the slurry to produce the powdered sorbent composition. The drying process may be performed using an oven or a spray dryer. In one embodiment of this method, the sorbent composition is $Fe^{(III)}_aFe^{(II)}_bSe^{(-II)}_xO^{(-II)}_y$. In one embodiment, the ratio of a:b depends on the oxidation process, and the value of x depends on the amount of the selenium. In one embodiment, the sorbent composition comprises iron (Fe) ranging from 60% to 70%, selenium (Se) ranging from 2.5% to 10%, and oxygen (O) ranging from 20% to 30%.

There is also disclosed A method for producing an Iron-Selenide-Oxide sorbent composition for removing mercury vapor from a gaseous stream, comprising the steps of: A. preparing in a reaction vessel employing a combination of mixing and aeration a base ferrous or ferric oxide ($FeO_x$) media comprising a non-stoichiometric mixed Fe(II)-Fe(III) iron oxide, the $FeO_x$ media having a lattice structure, B. conditioning the base $FeO_x$ media formed in Step A by mixing it into a aqueous slurry of ferrous selenite ($FeSeO_3$) and ferrous selenate ($FeSeO_4$) in a conditioning reactor to form a conditioned mixture, C. reducing the conditioned mixture formed in Step B by mixing an elemental iron ($Fe^0$) powder into the conditioned mixture to result in the reduction of selenite ($Se^{IV}$) and selenate ($Se^{VI}$) ions to become selenide ($Se^{-II}$) and then the incorporating of the selenide into the $FeO_x$ media lattice to create a slurry comprising a mixed $Fe^{(II)}/Fe^{(III)}$—$Se^{(-II)}$—$O^{(-II)}$ crystalline structural material, and D. dewatering and oxidizing the mixed $Fe^{(II)}/Fe^{(III)}$—$Se^{(-II)}$—$O^{(-II)}$ material to produce the sorbent composition in a powdered form.

In still another embodiment, there is disclosed an iron-selenide-oxide composition formed by the above-described method.

There is also disclosed a sorbent composition for removing mercury (Hg) vapor from a gaseous stream, comprising a chemical compound of iron (Fe), selenium (Se) and oxygen (O). In one embodiment, the ratio of iron (Fe) varies in the compound. In one embodiment, the bulk density of the chemical compound is 1.46 g/cm³. In one embodiment, the crystalline size of the chemical compound ranges from about 20 nm to about 200 nm. In one embodiment, the general formula for the chemical compound is $Fe^{(III)}_aFe^{(II)}_bSe^{(-II)}_xO^{(-II)}_y$, wherein the ratio a:b depends on the oxidation process, and the value of x depends on the amount of the selenium. In one embodiment of the sorbent composition, the iron (Fe) ranges from 60% to 70%, selenium (Se) ranges from 2.5% to 10%, and oxygen (O) ranges from 20% to 30%. In another embodiment, the sorbent composition of may further comprise a powdered activated carbon (PAC) material mixed therein. In one embodiment of the sorbent composition, Se is 9.7% by weight and the formula is: $Fe^{(III)}_{2.85}Fe^{(II)}_{0.65}Se^{(-II)}_{0.366}O^{(-II)}_{4.56}$ (FW=297). In another embodiment of the sorbent composition, Se is 2.6% by weight and the formula is: $Fe^{(III)}_{3.0}Fe^{(II)}_{0.8}Se^{(-II)}_{0.1}O^{(-II)}_{5.2}$ (FW=303).

In still another embodiment, there is disclosed an iron-selenide-oxide composition formed by the method of: A. preparing in a reaction vessel employing a combination of mixing and aeration a base ferrous or ferric oxide ($FeO_x$) media comprising a non-stoichiometric mixed Fe(II)-Fe(III) iron oxide, the $FeO_x$ media having a lattice structure, B. conditioning the base $FeO_x$ media formed in Step A by mixing it into a aqueous slurry of ferrous selenite ($FeSeO_3$) and ferrous selenate ($FeSeO_4$) in a conditioning reactor to form a conditioned mixture, C. reducing the conditioned mixture formed in Step B by mixing an elemental iron ($Fe^0$) powder into the conditioned mixture to result in the incorporating of the selenide into the $FeO_x$ media lattice to create a slurry comprising a mixed Fe—Se—O crystalline structural material, and D. dewatering and oxidizing the Fe—

Se—O material to produce the sorbent composition in a powdered form. In this embodiment, method Step A may further comprise mixing deionized water, $FeCl_2 \cdot 4H_2O$, and NaOH to form a precipitate per the reaction: $Fe^{2+}+OH^- \rightarrow Fe(OH)_2$ precipitate, wherein the initial stage of the mixture comprises a pH of about 11.80 and a mostly white colored precipitate, and wherein the aeration is moderated to drive an oxidation reaction: $4Fe(OH)_2+O_2 \rightarrow 4\gamma\text{-FeOOH}+2H_2O$ to form a mostly black precipitate known as magnetite, following the equation: $6Fe(OH)_2+O_2 \rightarrow 2Fe_3O_4+6H_2O$. The ratio of Fe(III) to Fe(II) is 1.0:0.5 at Step A in one embodiment. The mixed Fe(II)-Fe(III) iron oxide at Step A may comprise $Fe^{(III)}_{1.0}Fe^{(II)}_{0.7}O^{(-II)}_{2.2}$.

The conditioning reactor in the conditioning Step B may employ an internal headspace that is flushed with and maintained under an inert gas to create an oxygen-free environment. In one embodiment, the pH at the end of conditioning Step B is between 9.0 and 9.5. In one embodiment, the Fe—Se—O crystalline structural material formed in Step C comprises $Fe^{(III)}_{1.0}Fe^{(II)}_{2.5}Se^{(-II)}_{0.366}O^{(-II)}_{3.63}$. The slurry formed in Step C may further comprise salt residues, and wherein Step D may further comprise washing the slurry produced from Step C to remove the salt residues as described herein. Step D may further comprise drying the slurry to produce the powdered sorbent composition as described herein. In one embodiment, the sorbent composition is $Fe^{(III)}_a Fe^{(II)}_b Se^{(-II)}_x O^{(-II)}_y$. In one embodiment, the ratio of a:b depends on the oxidation process, and the value of x depends on the amount of the selenium. In one embodiment, the sorbent composition comprises iron (Fe) ranging from 60% to 70%, selenium (Se) ranging from 2.5% to 10%, and oxygen (O) ranging from 20% to 30%. This composition may further comprise a powdered activated carbon (PAC) material, the method further comprising the step of mixing the PAC with the powdered sorbent to create a mixture of powdered iron-selenide-oxide and PAC.

There is also disclosed a method of using an Iron-Selenide-Oxide sorbent composition for removing mercury vapor from a gaseous stream, comprising the steps of directly injecting a powdered form of the sorbent composition into the mercury-containing gaseous stream. In this method, the Iron-Selenide-Oxide sorbent composition may further comprise iron in forms of both Fe(III) and Fe(II) oxidation state and Se in form of Se(–II). In this method, the sorbent composition may be injected into the mercury-containing gaseous stream at a concentration range of 1 $mg/m^3$ to 100 $mg/m^3$ gas. There is further disclosed a method of using a sorbent composition for removing mercury vapor from a gaseous stream, comprising a direct injection of a mixture of powdered Iron-Selenide-Oxide sorbent composition and a powdered activated carbon (PAC) material. There is also disclosed a method of using a sorbent composition for removing mercury vapor from a gaseous stream, comprising a direct injection of a mixture of a powdered Iron-Selenide-Oxide sorbent composition and an inert particle material. There is still further disclosed a method of using an Iron-Selenide-Oxide sorbent composition for removing mercury vapor from a gaseous stream, comprising coating of a fabric filter used for filtering the gaseous stream with the sorbent composition. A method is also disclosed for using a sorbent composition as described herein for removing mercury vapor from a gaseous stream, comprising using a packed bed Iron-Selenide-Oxide sorbent filter.

There is also disclosed herein, a packed bed filtration system for filtering a mercury-containing gaseous stream comprising a porous matrix of a powdered Iron-Selenide-Oxide sorbent packing material used in the packed bed. There is also disclosed a fabric filter material used for filtering a mercury-containing gaseous stream comprising a porous fabric matrix coated with an Iron-Selenide-Oxide sorbent material as described herein.

DETAILED DESCRIPTION OF THE INVENTION

One embodiment of the present disclosure provides a sorbent composition for removing mercury (Hg) vapor from a gaseous stream, and methods of manufacturing and using the same.

As used herein, the terms "sorb," "sorption," and "sorbed," refer to the adsorption, sorption, or other entrapment of the contaminant on the flow-through article, either physically, chemically, or both physically and chemically. Further, Iron (II, III) oxide is the chemical compound with formula $Fe_3O_4$. It occurs in nature as the mineral magnetite. It contains both $Fe^{2+}$ and $Fe^{3+}$ ions and with an ideal stoichiometric ratio of Fe(III) to Fe(II)=2:1, magnetite is sometimes formulated as $FeO.Fe_2O_3$. It is one of a number of iron oxides, the others being iron(II) oxide (FeO), which is rare, and iron(III) oxide ($Fe_2O_3$) also known as hematite ($\alpha$-$Fe_2O_3$) or maghemite ($\gamma$-$Fe_2O_3$). Maghemite shares a similar crystalline structure with that of magnetite, i.e., both in form of a spinel crystalline.

Figure 1:
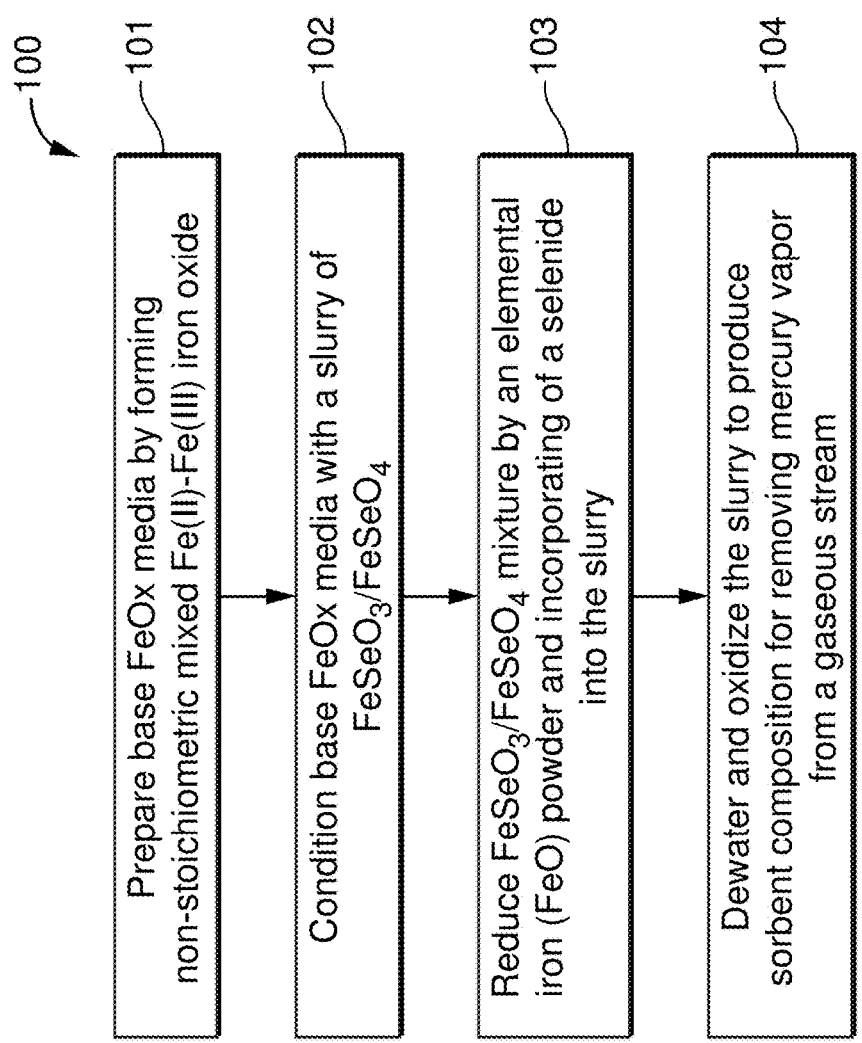
FIG. 1 depicts an exemplary flow chart illustrating a method for producing a sorbent composition for removing mercury vapor from a gaseous stream according to an embodiment of the present disclosure.

In an embodiment, a method 100 for producing a sorbent composition to remove mercury vapor from a gaseous stream as illustrated from step 101 to 104 in FIG. 1, is disclosed. In step 101, base $FeO_x$ media (or substrate) is prepared, and forms non-stoichiometric mixed Fe (II)-Fe (III) iron oxide. In step 102, the base $FeO_x$ i.e., non-stoichiometric mixed Fe (II)-Fe (III) iron oxide is conditioned with iron selenite ($FeSeO_3$) and iron selenite ($FeSeO_4$) slurry. Selenium in selenate and selenite, both oxyanions, are in oxidized form with valence of +6 and +4, respectively. In step 103, the iron selenite ($FeSeO_3$) and/or iron selenate ($FeSeO_4$) mixture is reduced by $Fe^0$ and the selenide ($Se^{(-II)}$) is incorporated into the $FeO_x$ structure. Finally, in step 104, the sorbent composition to remove mercury vapor is produced by dewatering and oxidation of the selenide incorporated $FeO_x$ slurry.

Step 1. Formation of Non-Stoichiometric Mixed Fe(II)-Fe(III) Iron Oxide.

Figure 2:
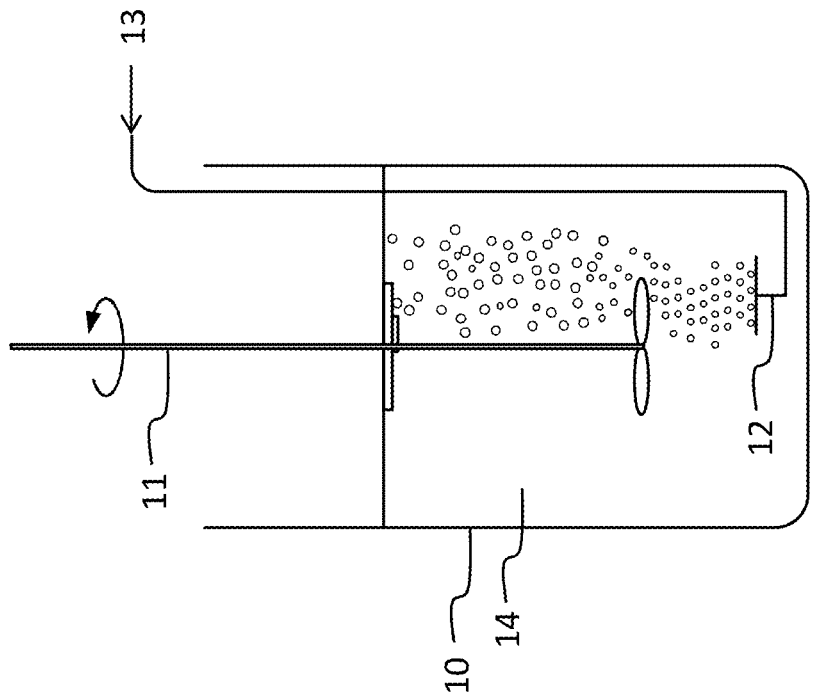
FIG. 2 depicts a schematic of the reactor set up for the production of $FeO_x$ base media according to an embodiment of the present disclosure.

In accordance with an exemplary embodiment, a schematic of the reactor set up for the production of $FeO_x$ base media disclosed in step 101 of the method 100, is illustrated in FIG. 2. The method 100 and exemplary recipe includes using, e.g., a 10 L open-top vessel 10 equipped with an electric overhead mixer 11 and an air diffuser 12 set at the bottom that can pump (via pump 13) a large quantity of fine air bubbles. In the 10 L vessel 10, add 5 L deionized water (DI water), add 0.5 mole $FeCl_2.4H_2O$ (i.e., 99 g), add 0.95 mole NaOH (39 g), and turn on the mixer 11 to mix the aqueous mixture 14 intensively. Further, turn on the air pump 13 to aerate the reactant mixture with an air flow of about 2.0 L/min.

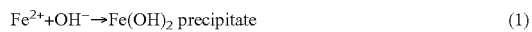

At the initial stage of the procedure, the mixture 14 comprises a pH of about 11.80. Initially the precipitate formed is mostly white, but quickly turns into a greenish slurry due to rapid oxidation of $Fe(OH)_2$ by dissolved oxygen at high pH. With the continued aeration, the slurry will gradually turn a dark greenish color, and then to a dark grey or black color particulate matter. It is understood that the oxidation of $Fe(OH)_2$ by oxygen could lead to several potential products being produced depending on pH, aeration rate, and background water composition matrix. For example, under an intensive aeration condition,

FeOOH could exist in several forms, but at an ambient temperature, it is most likely to become lepidocrocite ($\gamma$-FeOOH). This results in formation of a yellow to orange, or brownish color precipitate. The yellow to brownish, non-magnetic $\gamma$-FeOOH, however, is not a desired production procedure product. Rather, it is desirous to control the reaction towards the formation of a black precipitate that is more commonly known as magnetite, following the equation:

This reaction requires a moderate aeration rate. A slightly overdose $Fe^{2+}$ vs. NaOH also helps this magnetite ($Fe_3O_4$) forming reaction. Following this pathway, the oxidation of $Fe(OH)_2$ forms magnetite, which is a mixed valence Fe(III)-Fe(II) oxide that is black in color. Ideally, the formula should have a ratio of Fe(III) to Fe(II) at 1.0:0.5. The magnetite crystalline exhibits a strong magnetic property.

In this example, after mixing and aerating for 6 hours at ambient temperature, the base $FeO_x$ product appears mostly close to magnetite in terms of crystalline structure and magnetic property. However, wet chemistry analysis indicates that the ratio of Fe(III) to Fe(II) of the $FeO_x$ product deviates significantly from the ideal ratio of 1.0 Fe(III) to 0.5 Fe(II) of a standard magnetite formula. Repeated tests on multiple samples produces a ratio of Fe(III) to Fe(II) ranging from 1.0 Fe(III):0.6 Fe(II) to 1.0 Fe(III):0.8 Fe(II), which indicates that the product has a non-stoichiometric formula with an Fe(II)-enriched structure that bears an inverse-spinel structure similar to magnetite. The XRD results for this product match with that of magnetite despite the different Fe(III) to Fe(II) ratio. After mixing and aerating for 6 hr at ambient temperature, the base $FeO_x$ media is formed, and produces about 40 g of dry iron oxides. The product from step 101, has a typical formula that can be approximated as: $Fe^{(III)}_{1.0}Fe^{(II)}_{0.7}O^{(-II)}_{2.2}$.

Step 2. Conditioning of the Base $FeO_x$ Media with $FeSeO_3$ and $FeSeO_4$ Slurry.

Figure 3:
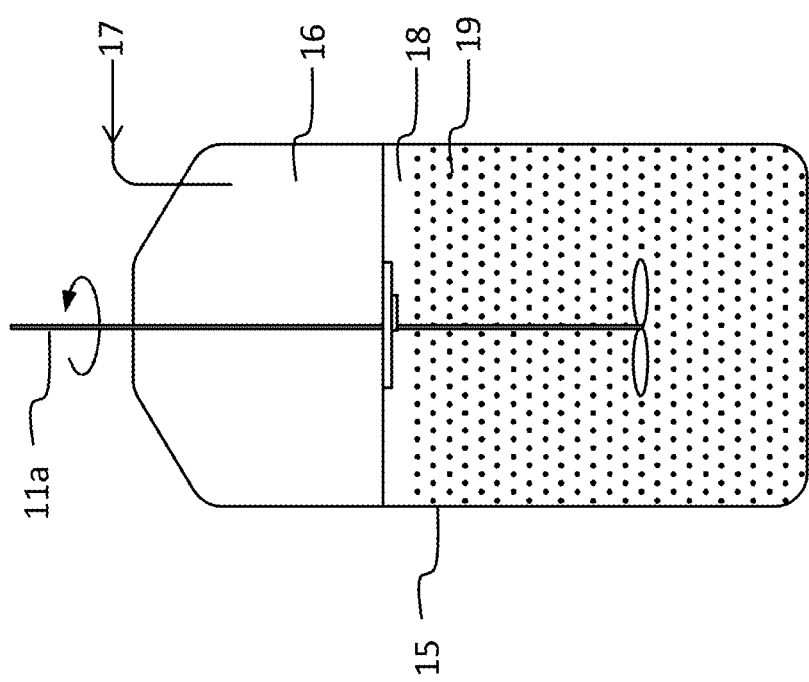
FIG. 3 depicts a schematic of the reactor set up for step 2 and 3 of the method according to an embodiment of the present disclosure.

In one embodiment, a schematic of the reactor set up for step 102 and 103 of the method 100 is illustrated in FIG. 3. A 10 L closed vessel 15 with internal mixer 11a is used in these steps. The headspace 16 of the reactor vessel could be flushed with an inert gas 17, such as nitrogen ($N_2$) to create an oxygen free environment. 5 L deionized water (DI water) is added into the reactor vessel, 0.06 mole $Na_2SeO_3$ (10.38 g) and 0.03 mole $Na_2SeO_4$ (5.67 g) are added, and dissolved in the water to create an aqueous mixture 18. In total, 0.09 mole Se or 7.11 g Se was added. Then, 0.08 mole of $FeCl_2.4H_2O$ (15.9) is added into the reactor vessel 15. As ferrous selenite ($FeSeO_3$) has a low solubility, the addition of $Fe^{2+}$ and the mixing results in the formation of thick slurry 19 (i.e., $FeSeO_3$ precipitate) (here, in white color at this stage). Generally, selenate is more soluble, however, the experiment results indicated that much of the selenate is immobilized, possibly being trapped or adsorbed onto the ferrous selenite flocs. Next, the base $FeO_x$ media from step 101 is added into the vessel 15 while mixing, and the vessel is again closed. The base $FeO_x$ media quickly mixes with the $FeSeO_3/FeSeO_4$ slurry to form a uniform slurry of a black color. The slurry is mixed continuously for 2 hrs. It appears that the $FeSeO_3/FeSeO_4$ adsorb onto the $FeO_x$ base crystalline to form a coating. Fe(II)-rich iron oxides, such as green rusts are known to be capable of reducing selenite and selenate. Certain redox interactions may actually occur between the base media and the $FeSeO_3/FeSeO_4$, but the specific underlying chemistry of this reaction is not yet fully understood. The pH at the end of conditioning is typically between 9.0 and 9.5.

Step 3. Reduction of $FeSeO_3/FeSeO_4$ Mixture by $Fe^0$ and the Incorporation of Selenide into the $FeO_x$ Structure.

Upon completion of step 102 (step 2), open the reactor and add 100 g of elemental iron (or $Fe^0$) powder, in accordance with step 103 of the method 100. The $Fe^0$ powder was collected between 100 and 200 mesh sieves, which was about 0.074 to 0.15 mm in nominal diameter. The reactor 15 is closed; and the mixer 11a is allowed to stir for 3 days to complete fluidization of the media 18, 19 in the reactor. The pH of the mixture changes over time during the process, for example, pH rises from the initial 9.0 to 11.0 after about 24 hours of reaction time, and then gradually decreases to near neutral (pH 6.5-8.5). The color of the slurry remains dark, however, it becomes dark brownish, coffee color at the end of the reaction. The transformation reaction(s) is completed after 3 days of reaction, and the solid media can be harvested as the intermediate product. In one embodiment, the reactor is allowed to settle for a short time, for e.g., 5 minutes, where $Fe^0$ grains mostly settle at the bottom; the top slurry is then decanted to another vessel. As such, nil or very little $Fe^0$ is present in the produced or harvested slurry, as shown by X-ray diffraction analysis. However, the slurry is unstable, and on exposure to air, the slurry could be quickly oxidized. The pH rises rapidly from near neutral to over 11, and the top slurry that comes into contact with air produces an orange color. No dissolved selenite or selenate was detected in the liquid phase, indicating that all Se was incorporated into the solid phase.

$Fe^0$ is a reductant capable of reducing trace concentrations (e.g., in mg/L) of dissolved selenite and selenate ions in water/wastewater remediation application under certain well-controlled conditions. (Y. Q. Zhang, et al. *J. Environ. Qual.*, 2005, 34, 487-495; Huang et al. *Water Science and Technology*, 2012, doi: 10.2166/wst.2012.446; C. Tang et al. *Water Research* 2014, doi:10.1016/j.watres.2014.09.016). In the sorbent composition of an embodiment, the addition of $Fe^0$ to the slurry reactant system is used to initiate the reduction of ferrous selenite and selenate in large quantities (unlike in the wastewater application) in conjunction with the presence of a large amount of reactive base $FeO_x$ media, which results in the reduction of $Se^{(IV)}$ and $Se^{(VI)}$ and their incorporation into the $FeO_x$ lattice in the form of structural $Se^{(-II)}$. The presence of $Se^{(-II)}$ is not limited to the $FeO_x$ surface, rather $Se^{(-II)}$ becomes an intrinsic component of the mixed Fe—Se—O structure.

Wet chemistry analyses on the wet slurry collected from step 103 (step 3) shows that the bulk of the slurry is in the form of a highly reduced iron oxide with respect to its iron valence and compositions. Iron in the structure is predominantly present as Fe(II), with the ratio of Fe(II):Fe(III) now increasing to over 2.2 Fe(II) to 1.0 Fe(III), a significant change from the average ratio of 0.7 Fe(II):1.0 Fe(III) observed in the base $FeO_x$ material. X-ray Photoelectron spectroscopy (XPS) analysis suggested that Se primarily exists in -2 valence and thus is binding with $Fe^{2+}$ (or $Fe^{3+}$), not $O^{2-}$ in the iron oxide lattices. It was also discovered that after dissolving the slurry with 3 N HCl overnight, no selenite or selenate ion was detected in the liquid phase, suggesting that the original selenite and selenate ions from step 102 (Step 2) have been chemically transformed. Although Fe was totally dissolved, there was solid residue that could not be dissolved by 3 N HCl. The solid residue had a purple and reddish color. XRD analysis indicated that the red solid residue is elemental Se in crystalline form. Analysis of fresh wet slurry using XRD, however, indicates that no elemental Se is present in the fresh product or sorbent composition. Thus, it is probable that the 3 N HCl treatment resulted in the formation of $Se^0$ upon the destruction of the Fe—Se—O structure.

Based on the mass balance principle and the analyses conducted with the slurry media, the typical compositional formula for the wet slurry harvested from step 103 (step 3) can be estimated to be $Fe^{(III)}_{1.0}Fe^{(II)}_{2.5}Se^{(-II)}_{0.366}O^{(-II)}_{3.63}$, with a formula weight (FW) of 282. For the ingredients or recipe used in this method or production, it is estimated that, 0.246 mole could be produced with a total weight of about 69 g.

Step 3 also results in the formation of various salts that will be rinsed out in the final step. These come from the residual ions added as the initial ingredients, such as Na from $Na_2SeO_3$ or $Na_2SeO_4$ and $Cl^-$ from $FeCl_2.4H_2O$.

Step 4. Rinsing, Dewatering and Oxidation of the Slurry to Become a High-Performance Mercury Sorbent (V-Sorbent).

Upon completion of step 103 (step 3), the produced or harvested slurry must be washed to remove any salts formed in step 104 (step 4). The washing process could be accomplished by several ways. For example, it could be done through a few cycles of a settling/supernatant decanting/DI water rinsing process. Alternatively, the slurry could be filtered pressed, and rinsed with DI water. Further, the drying process could be achieved in multiple ways. The wet cake could be dried directly in an oven with ventilation and controlled temperature, e.g., setting at 110° C. Alternatively, the rinsed wet slurry could be processed with a spray dryer with an air temperature of 130° C. The final product can be collected by a filter and also in the cyclone. In case of oven drying, the dried cake must be pulverized. The spray dryer method is preferred for laboratory scale production, because of the instant drying and production of very fine powder composition.

As described previously, the wet slurry from Step 103 is an Fe(II) enriched product with Fe(II) to Fe(III) ratio tilted significantly towards Fe(II). Through this drying process in the air environment, however, it appears that significant fraction of Fe(II) would be oxidized by air upon drying. The selenium in form of selenide (valence -2) would remain largely unchanged (no oxidizing to elemental selenium).

The final sorbent composition was dissolved overnight in 3 N HCl. The solute was analyzed for Fe(II) and Fe(III), and it was found that in the dried sorbent, Fe(III) to Fe(II) ratio increased significantly compared to the wet slurry product, from step 103 (step 3). For the sample produced by the spray dryer, a ratio of 1.0 Fe(III) to 0.23 Fe(II) was detected in the sorbent composition. In comparison, before the spray drying process, the wet sorbent media has a ratio of 1.0 Fe(III) to 2.5 Fe(II). The spray drying process alters the oxidation states of Fe in the sorbent media. Further, it is assumed that the sorbent is oxidized by oxygen in the air at elevated temperature during the spray drying process.

Characterization of the V-Sorbent Product

The scanning electron microscope (SEM) micrographs referenced herein were taken with a magnification of 1,000 to 100,000 times and the elemental compositions were profiled with Energy Dispersive Spectroscopy (EDS) that reported the compositional ratio of Fe, Se, and O in the sorbent crystalline.

Figure 4A:
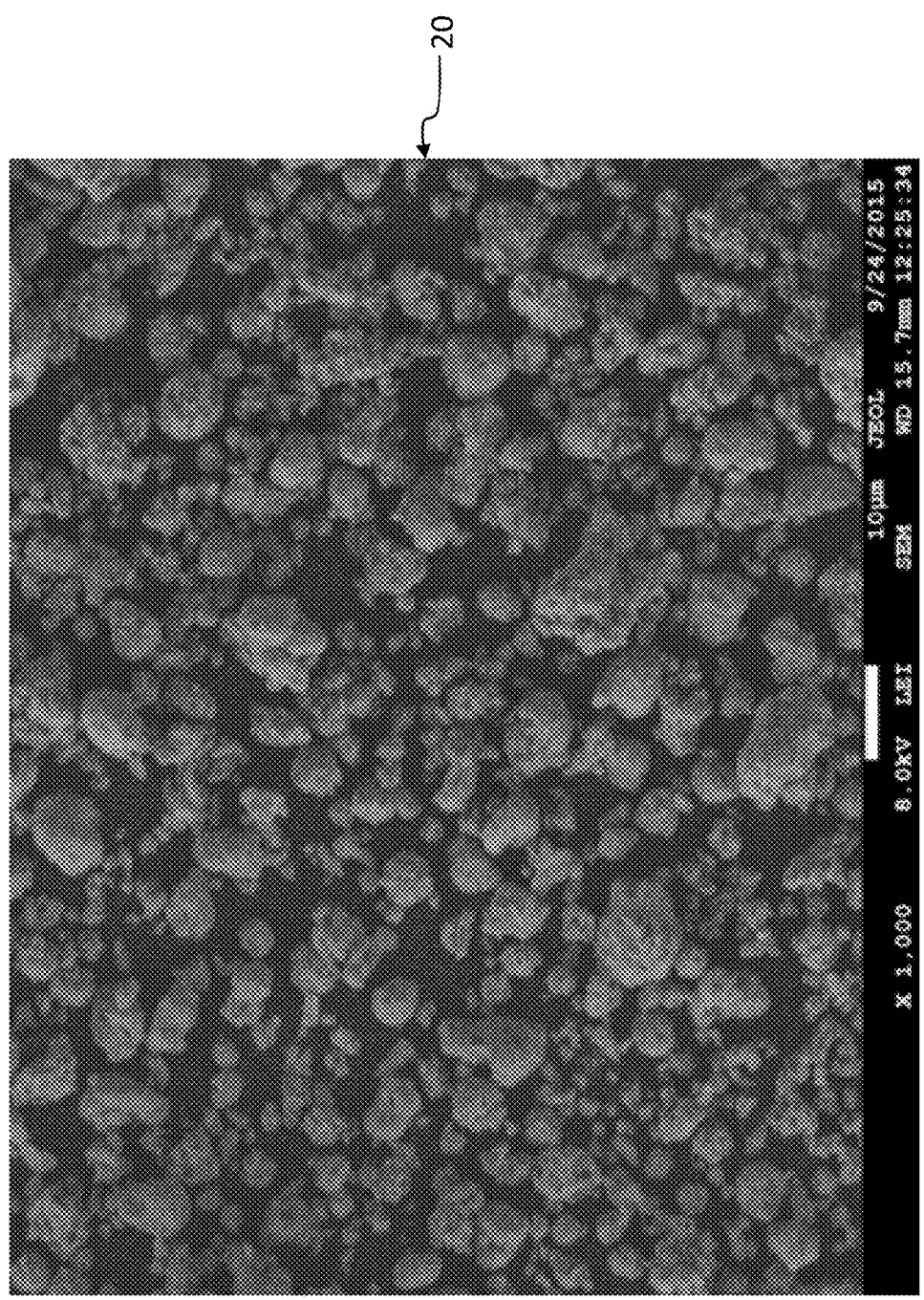
FIG. 4A depicts an SEM micrograph image of a V-Sorbent crystalline composition according to an embodiment of the present disclosure.
Figure 4B:
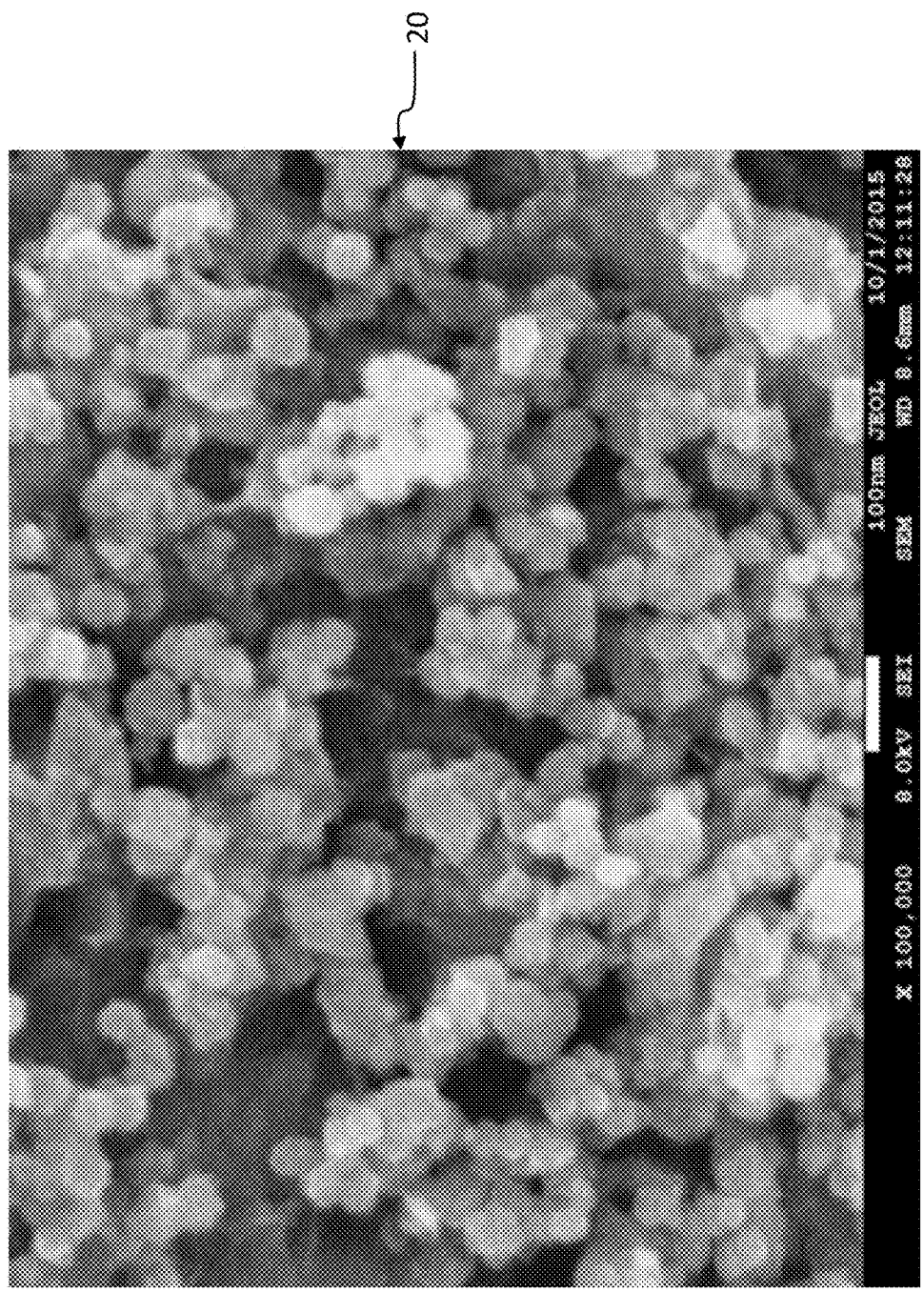
FIG. 4B depicts another SEM micrograph image of the V-Sorbent crystalline composition shown in FIG. 4A.
Figure 4C:
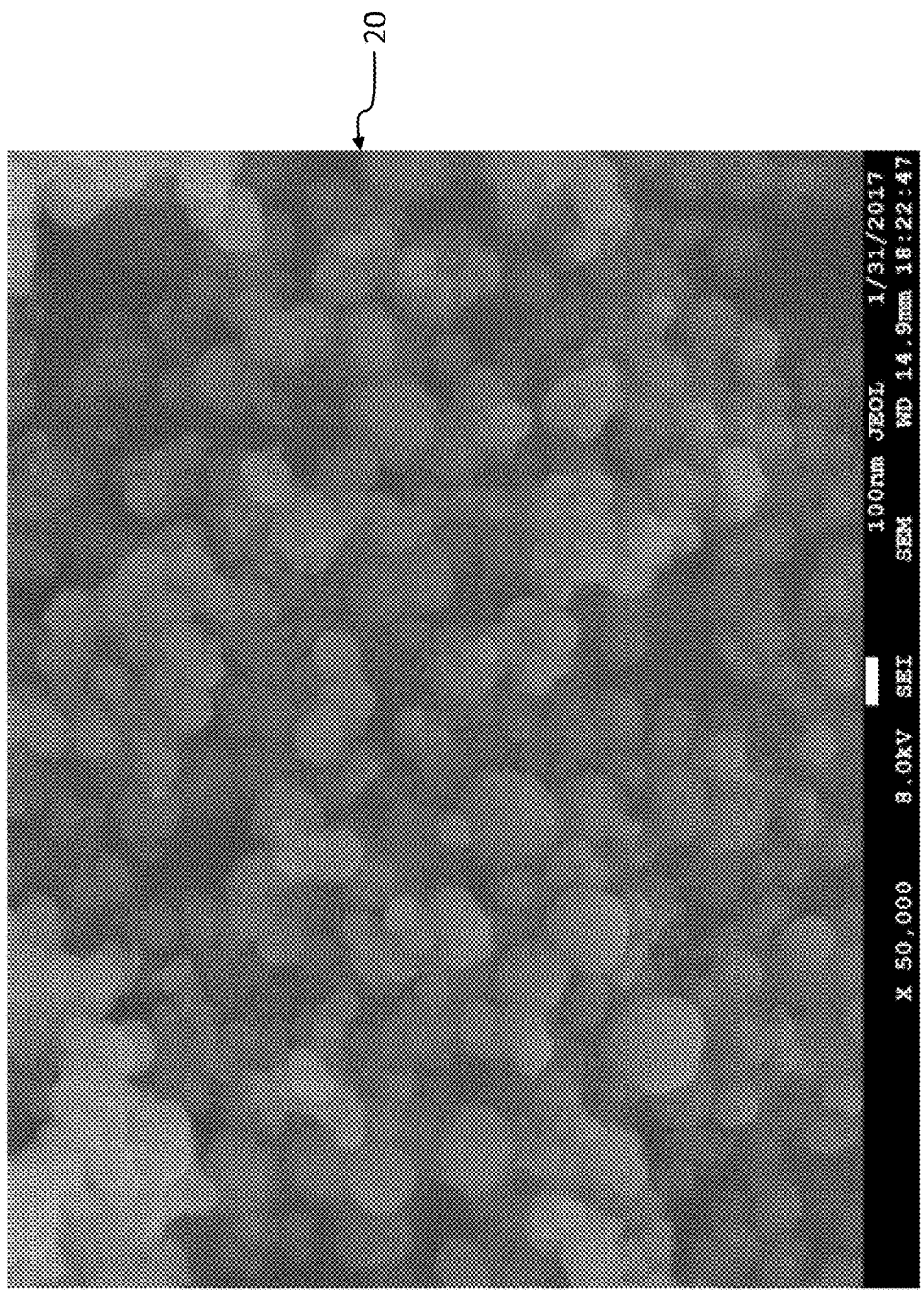
FIG. 4C depicts another SEM micrograph image of the V-Sorbent crystalline composition shown in FIG. 4A.

FIGS. 4A, 4B, 4C depict SEM images of a sorbent crystalline composition 20 according to an embodiment of the present disclosure. Specifically, FIG. 4A shows an SEM micrograph of the V-sorbent aggregates of sorbent crystalline, size varying from around 1 μm to 10 μm (×1000 magnification). FIG. 4B shows an SEM micrograph of the V-sorbent nanoscale crystalline formed after a typical 3-days reaction time in step 3, size about 30-50 nm (×100 k). FIG. 4C shows an SEM micrograph of the V-sorbent increased size of crystalline to about 50-200 nm after the wet slurry extended storage (10 days) for recrystallization and growth (×100 k). The spray dryer method produces a fine product or composition of black or dark brownish powder. Under a microscope, it could be seen that the sorbent particles are in sizes between 1 μm and 10 μm. For the wet-cake oven drying method, the final particle size depends on the pulverization method. The sorbent composition possesses a strong magnetic property. The bulk density of sorbent composition in fine powder form is 1.46 g/cm$^3$. Under the SEM, the powder sorbent composition displays particles consisting of numerous nano-scale fine crystalline aggregates. The crystalline sorbent composition possesses a size of about 20 nm to 200 nm.

True density, however, is expected to be similar to that of magnetite (5.2 g/cm3) or maghemite (ca. 4.8 g/cm3). Under the scanning electron microscope (SEM), the sorbent powder particle can be seen consisting of numerous nano-scale fine crystalline aggregate. A single crystalline has a size of ranging from 20 to 200 nm, depending on the production method and wet slurry storage time (FIGS. 4A-4C).

Figure 4D:
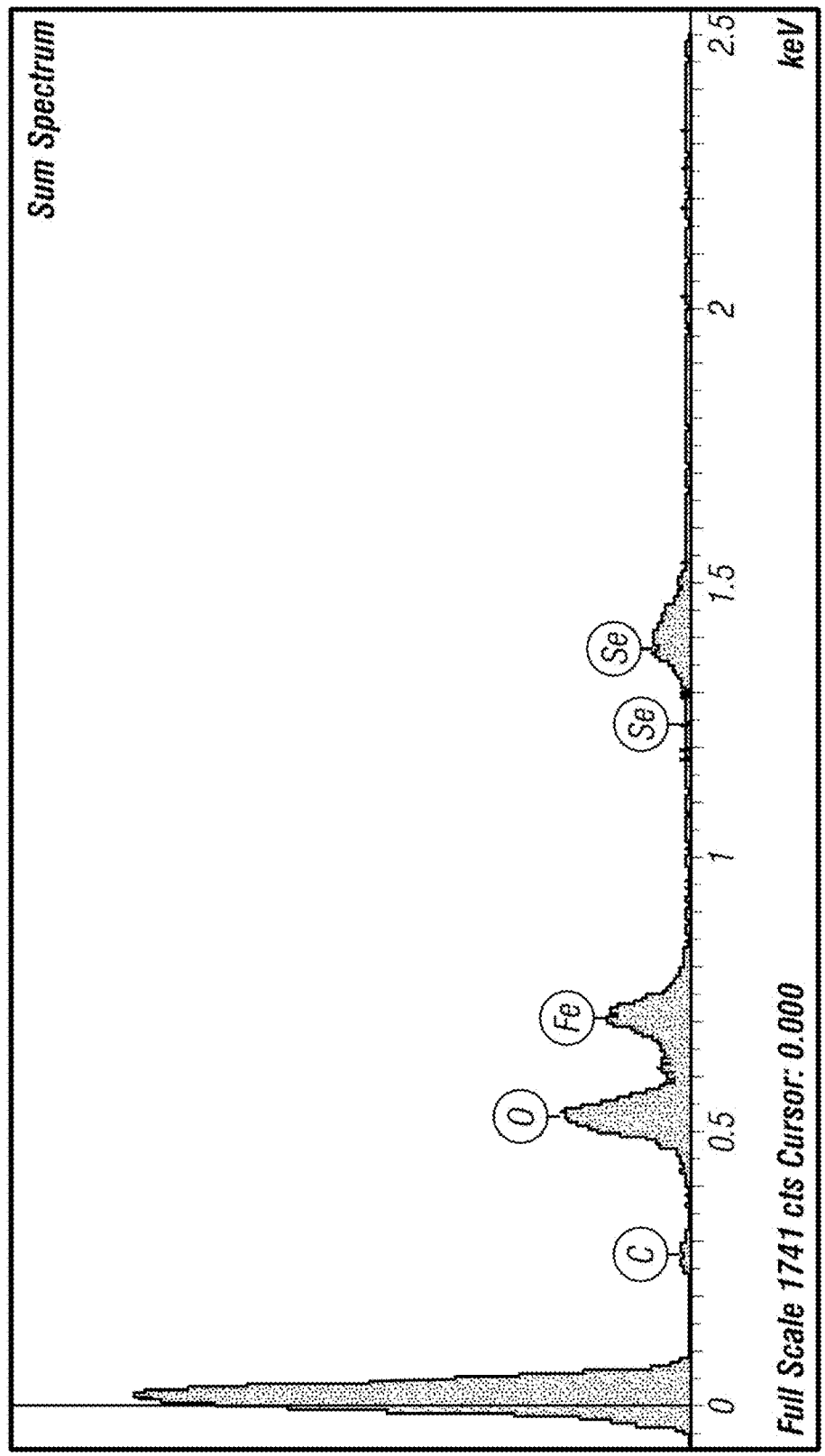
FIG. 4D depicts an Energy Dispersive Spectroscopy (EDS) Spectrum for another V-Sorbent crystalline composition according to an embodiment of the present disclosure, the EDS Composition Profile of this V-Sorbent Sample being tabulated in Table 1A.
Figure 4E:
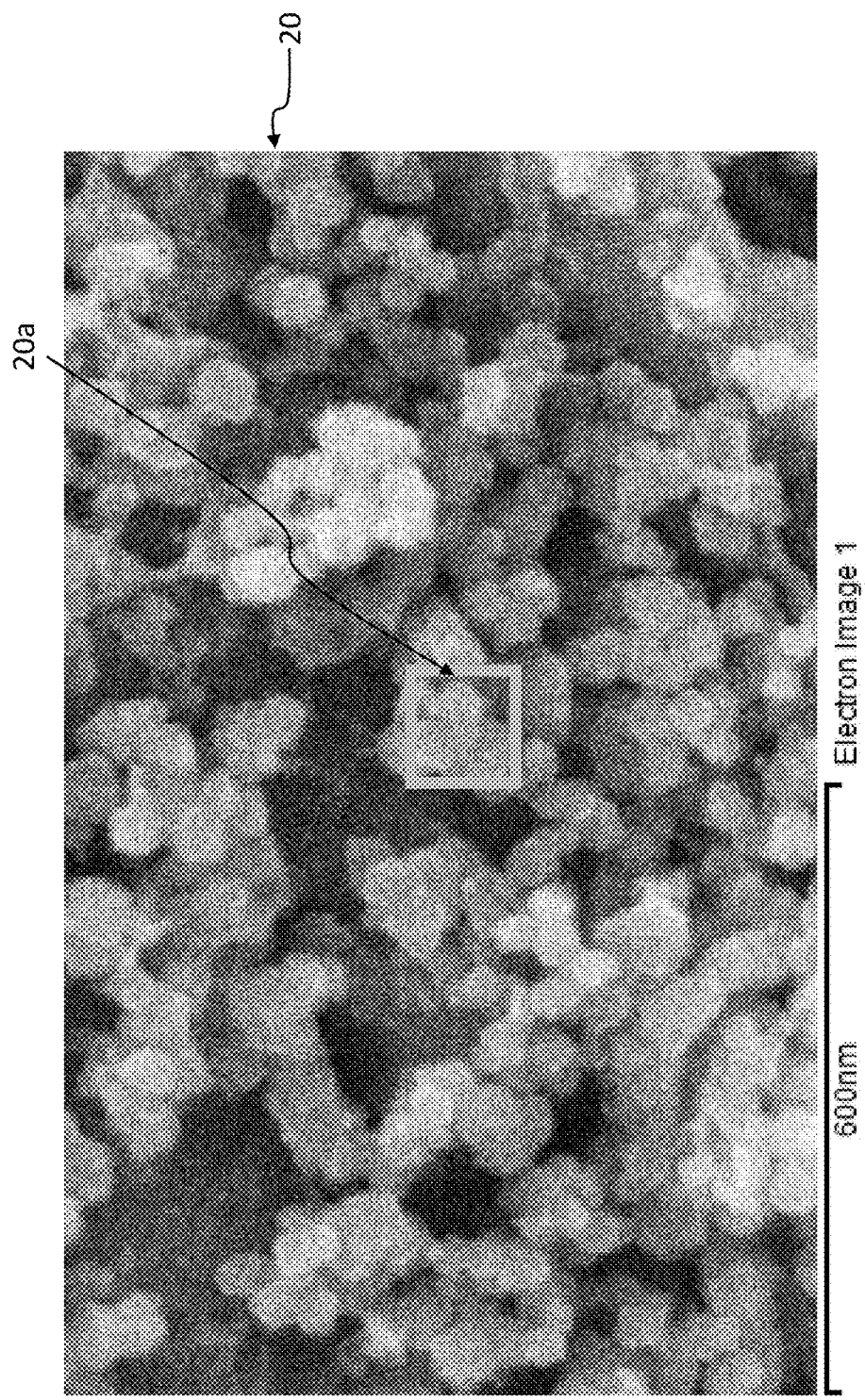
FIG. 4E depicts an SEM micrograph image of the V-Sorbent crystalline composition of in FIGS. 4A-4C where the highlighted box indicates the spot where the EDS of FIG. 4D was performed.

EDS performed on two samples, 20, 21 showed the elemental composition of the sorbent media. For example, referring now to FIGS. 4A, 4B, 4C, 4D, 4E and Table 1A, there is shown for one V-Sorbent Sample 20 an Energy Dispersive Spectroscopy (EDS) Spectrum (FIG. 4D), SEM micrograph for the sample 20 showing the spot 20a where the EDS was performed (FIG. 4E), the EDS Composition Profile of the V-Sorbent Sample being tabulated in Table 1A.

TABLE 1A

EDS Composition Profile of V-Sorbent Sample

| Element | Weight % | Atomic % |
|---|---|---|
| C | 2.58 | 7.37 |
| O | 22.93 | 49.06 |
| Fe | 62.89 | 38.55 |
| Se | 11.60 | 5.03 |
| Totals | 100.00 | 100.00 |

Figure 4F:
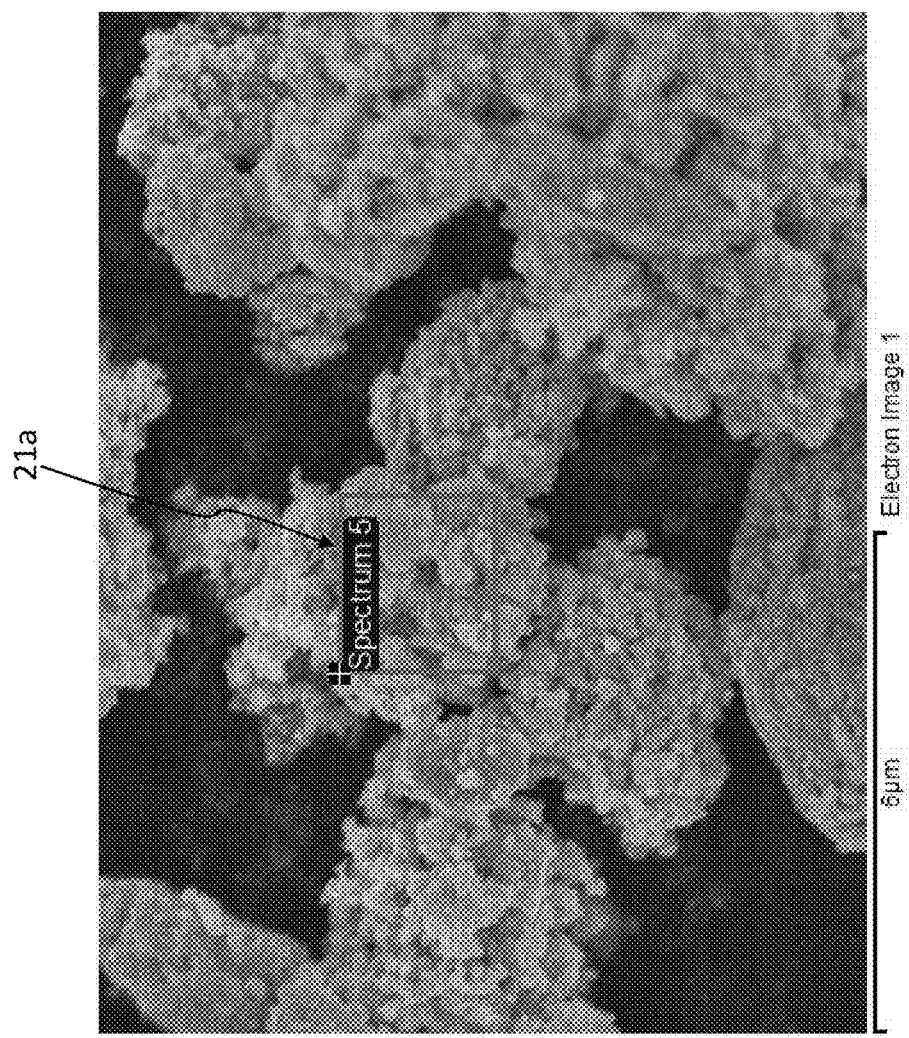
FIG. 4F depicts an SEM micrograph image of another V-Sorbent crystalline composition according to an embodiment of the present disclosure where the highlighted box indicates the spot where the EDS was performed, the EDS Composition Profile of this V-Sorbent Sample being tabulated in Table 1B.

Referring now to FIG. 4F and Table 1B, there is shown for a second V-Sorbent Sample 21 an SEM micrograph for the sample showing the spot 21a where the EDS was performed, the EDS Composition Profile of the second V-Sorbent Sample being tabulated in Table 1B.

TABLE 1B

EDS Composition Profile of V-Sorbent Sample

| Element | Weight % | Atomic % |
|---|---|---|
| C | 2.28 | 6.50 |
| O | 23.54 | 50.26 |
| Fe | 62.33 | 38.12 |
| Se | 11.84 | 5.12 |
| Totals | 100.00 | 100 |

The sorbent composition product has a well crystalline structure. X-ray diffraction analysis found that the sorbent composition material produces an XRD spectrum similar to that of magnetite (or maghemite as the two shares almost identical XRD patterns). The main structure of the sorbent composition material is a spinel structure that is a common structural arrangement shared by many oxides of the transition metals with formula $AB_2O_4$, which crystallize in the cubic (isometric) crystal system, with the oxide anions arranged in a cubic close-packed lattice and the cations A and B occupying some or all of the octahedral and tetrahedral sites in the lattice. A and B can also be the same metal with different valences, as in the case with magnetite, $Fe_3O_4$ (as $Fe^{2+}Fe^{3+}_2O^{2-}_4$).

Depending on the recipe or ingredients, and the dosage of selenite and selenate relative to the quantity of base $FeO_x$ media, the sorbent composition will change accordingly, but still can be represented generally as $Fe^{(III)}_aFe^{(II)}_bSe^{(-II)}_xO^{(-II)}_y$, in which a to b ratio (a:b) could vary significantly depending mainly on the oxidation level accomplished in Step 104 (step 4) of the method 100; x value depends on the dosage of selenium. For the recipe and the quantity of raw material used in this exemplary production or method, the formula was found to be $Fe^{(III)}_{2.85}Fe^{(II)}_{0.65}Se^{(-II)}_{0.366}O^{(-II)}_{4.56}$ (FW=297). When compared to the wet media after Step 103 (step 3) (i.e., $Fe^{(III)}_{1.0}Fe^{(II)}_{2.5}Se^{(-II)}_{0.366}O^{(-II)}_{3.63}$), a significant fraction of Fe(II) is oxidized, and more oxygen is incorporated into the structure. As a result, the mass of sorbent composition increases slightly to 73 g, where Fe accounts for 65.7%, Se accounts for 9.7%, and O accounts for 24.6%.

The description above only represents one recipe for producing the sorbent composition. In another embodiment, the recipe could be modified in two ways: first, the amount of base $FeO_x$ media could be changed in step 101 (step 1), or the amount of selenium dosage could be changed in step 102 (step 2). For example, the dosage of selenite, selenate, $Fe^{2+}$ in step 102 (step 2) could be reduced proportionally to 0.02, 0.01, and 0.02 moles. If the dosage in Step 101 (step 1) and Step 103 (step 3) remain the same, then the sorbent composition would change approximately to $Fe^{(III)}_{2.85}Fe^{(II)}_{0.65}Se^{(-II)}_{0.122}O^{(-II)}_{4.8}$, in which Se accounts for about 3.3%. The decreased Se in this sorbent composition would reduce the total capacity of the sorbent composition for capturing mercury vapor. Based on varying the Se dosages from as low as 1% to over 20% by weight in the sorbent composition, it has been shown that, the higher Se % in the composition formula generally increases the effectiveness and capacity of the sorbent composition.

In an embodiment, a sorbent composition for removing mercury (Hg) vapor from a gaseous stream is also disclosed. In one embodiment, the sorbent composition comprises a chemical compound of iron (Fe) and selenium (Se). The chemical compound is produced by the method as illustrated in FIG. 1 to FIG. 4, and as described above. The ratio of iron (Fe) is varied in the chemical compound.

Methods to Apply the New Sorbent Media to Capture Mercury

Mercury removal from a gaseous stream has many applications in various industries, for example: (1) In electric generation, coal-fired power plants are required to control Hg emission in the flue gas; (2) For municipal waste incineration, Hg is identified as a major pollutant that needs to be controlled in its burning exhaust; (3) In the cement industry, cement kiln exhaust is also often contaminated with high Hg vapor, which is also regulated in the US; and (4) In natural gas extraction, mercury is often found in the raw natural gas that not only is an environmental pollution concern but also poses a safety threat to the gas processing equipment. Hg vapor must be removed from the raw natural gas before being further processed.

The new sorbent's fast sorption/reaction rate, high capacity, chemical robustness and stability of Hg removal, enable various flexible uses of the new sorbent in removing mercury vapor from a gaseous stream. Exemplary methods of using the sorbent composition for removing mercury vapor from a gaseous stream are disclosed. In one embodiment, the method comprises direct injection of the powdered sorbent composition into the ductwork for the gaseous stream to capture mercury in flight. The composition could be applied upstream of the particulate matter control unit such as an electrostatic precipitators (ESP) or a baghouse. Because of the extremely high capacity and efficiency of the new sorbent or sorbent composition, the required application rate for the sorbent could be much lower than that of conventional PAC or Br-PAC. For example, an application rate equivalent to 1 percent of current PAC might be sufficient. In this case, a relatively small injection and sorbent storage system will be sufficient. With reduced injection system and injection rate, the system capital cost and sorbent cost could be significantly lowered.

In another embodiment, the method comprises direct injection of a mixture of the new sorbent or sorbent composition and a PAC powder into the ductwork for a gaseous stream to capture mercury in flight. Similarly, the sorbent/PAC mixture could be applied upstream of the particulate matter control unit. The use of a mixture of the new sorbent with conventional PAC media may have the added advantage of adding to the PAC's sorption capacity. In one such mixture, the combined media may contain 0.5-10% of the new sorbent with the rest comprising PAC. One advantage of using the mixed media is that the mixed media will have similar physical properties to that PAC. Thus, the media could be used without a need to modify the existing PAC application apparatus. Currently, many coal-fired power plants in the US have installed PAC injection based Hg control technology. Thus, such mixture of new sorbent and PAC could be easily implemented.

In another embodiment, the method comprises direct injection of the new sorbent mixed with inert particles. The inert media could be chosen from various sources. For example, certain clay powders, pulverized iron ores, diatom earth, or even the fly ash. For dry powder injection applications, the contact time between the new sorbent crystalline with the flue gas is limited to no more than a few seconds. In one embodiment, the sorbent comprises a particle size of about 1 to about 10 µm, consisting of numerous nano-scale size crystalline particles in large aggregates. Thus, the large Hg removal capacity is mostly unused in the application. One way to increase the use efficiency of the new sorbent capacity is to make the sorbent particle size as small and dispersed as possible, preferably in sub-micron sizes. The extra fine sorbent particles could then be coated on the larger inert particles, essentially using the larger inert particles (e.g., 10 µm) as the sorbent carrier. Direct use of sub-micron sorbent might pose a challenge to the particulate matter collector such as the ESP. With the sub-micron V-sorbent coated on a larger particle, the injected media would not pose a problem to the down-stream treatment processes.

In another embodiment, the method comprises coating of a fabric or filter bag of a baghouse with the new sorbent composition. For a coal-fired power plant equipped with a baghouse, the sorbent media could be coated on the fabric filtration bag. In a typical baghouse, several thousands of filter bags are installed with a total area of thousands of square meters. In a laboratory trial, submerging/coating the filter bag directly into the wet sorbent slurry, and then drying it could naturally place a rather uniform layer of sorbent media on the fabric structure. It is estimated that 200 g of the new sorbent could be emplaced on 1 $m^2$ fabric. The fabric typically has a thickness of about 2-3 mm. For a typical baghouse operation, the treated gas flows through the fabric at a rate of about 1 cm/sec. As such, the new sorbent media has about 0.1-1 second contact time. The reaction time is short, but based on column filtration tests, a contact time of 0.1 second is sufficient to remove over 99% Hg as discussed further in the laboratory result section. For a bag house with 10,000 $m^2$ filtration fabric area, 2000 kg of the new sorbent could be loaded onto the fabric bag in the system. This would be sufficient to remove 400 kg Hg. For a mid-size power plant, the annual Hg removal is in the order of 10 or 100 kilogram. Therefore, a bag house loaded with 2000 kg of the new sorbent would be sufficient for Hg removal for at least one year, potentially multiple years.

In yet another embodiment, the method comprises one or more filtration beds packed with the sorbent composition. In this packed bed filtration example, a filtration structure could be installed within the flue-gas treatment system. Preferably, it would be installed downstream of the particulate matter removal system such as ESP or baghouse to avoid the potential interferences of fly ash particles, such as surface deposition or pore clogging. In some embodiments, the sorbent could be installed within the wet scrubber or in the stack. The design contact time could be as low as 1 second. As such, the size of the mercury filtration bed could be relatively small. Due to the large sorption capacity of the new sorbent, it is possible that the Hg filtration bed could last many years before a need to replenish or replace the sorbent media. The packed bed should have a high porosity and low flow resistivity.

Advantages of the New V-Sorbent Technology

There are numerous advantages of the sorbent composition technology disclosed herein: high total capacity for capturing mercury; high removal efficiency of the sorbent; effectiveness for both $Hg^0$ and $Hg^{2+ \; or \; 1+}$; tolerance of elevated or higher temperatures; security of mercury captured, and compatibility of the sorbent with the fly ash reuse. For the sorbent with 10% Se, 1 gram sorbent can capture and incorporate as high as 200 mg Hg into its crystalline structure, or 20% of the sorbent weight. For a conventional sorbent medium like PAC, pollutants are bound to certain surface functional sites. Due to the limited surface area and sites, a surface-sorption based sorbent rarely achieves a specific sorption capacity of over 1% of the sorbent weight.

For the new sorbent disclosed herein, the surface functional site alone would not enable the extraordinary high Hg capture capacity. For this sorbent, the mechanism of removing Hg involves not only the solid/gas interfacial chemistry, but also the solid-state chemistry that allows $Hg^0$ to be oxidized to become $Hg^{2+}$ and then incorporated into the lattices of $FeO_x$ crystalline. Moreover, owing to the high ion and electron conductivity of the sorbent media, $Hg^{2+}$ ions could quickly diffuse deep into the core of the crystalline. With the unique reactive properties of this sorbent, the interactions among $Se^{2-}$, $O^{2-}$, $Hg^0$, $Hg^{2+}$, $Fe^{3+}$ and $Fe^{2+}$ would allow $Hg^0$ to be quickly oxidized by $Fe^{3+}$ to become $Hg^{2+}$, possibly being facilitated by $Se^{2-}$. The unique properties of mixed Fe(III)-Fe(II) valences, non-stoichiometry, and the inverse spinel structure together contribute to the extraordinary high ion and electron transfer capability in the sorbent crystalline structure, which allows $Hg^{2+}$ to quickly migrate from the initial surface functional sites deep into the inner bulk structure. This would vacate the surface functional sites, which can be used again to capture more Hg.

Assuming the sorbent media herein exists in the form of a uniform sphere particle of 50 nm in diameter. 1 g of the media would provide a total surface area of about 12 m². Assuming that one Hg sorption surface site (i.e., the selenide site) is available on a surface area of 6×6A² (calculated by Se atom numbers relative to O atom numbers in the V-sorbent with 9.7% Se by weight) and that all surface available $Se^{(-II)}$ sites are occupied by Hg atoms, a total maximum amount of 11 mg Hg would be captured if only the surface $Se^{(-II)}$ sites were used. In reality, the V-sorbent (with 9.7% Se by weight) could capture over 200 mg Hg per 1 g sorbent, much higher than the surface $Se^{(-II)}$ site alone could achieve. Thus, it can be inferred that the inner $Se^{(-II)}$ lattice sites also contribute to the capture of Hg. Indeed, the XPS analysis on the spent V-sorbent used after Hg filtration test (with about 20% Hg by weight in the spent V-sorbent) showed that Hg concentration remains unchanged as the surface layer of the spend sorbent was removed through argon sputter operation.

This new sorbent filtration can decrease Hg to an extremely low concentration level. Virtually, no Hg could escape from being captured from the filtration column. For example, this new sorbent could achieve more than 99.9999% removal efficiency in less than 0.5 seconds of contact time, reducing 5000 μg/m³ Hg to below 0.002 μg/m³.

Further, this new sorbent can capture both $Hg^0$ and $Hg^{2+}$ or $^{1+}$ forms of mercury, and achieve high removal efficiency. In contrast, conventional powdered activated carbon (PAC) is effective for $Hg^{2+}$ or $^{1+}$, but performs poorly for $Hg^0$. As mercury commonly exists in both $Hg^0$ and $Hg^{2+}$ or $^{1+}$ forms, a stringent Hg emission standard would require a control technology to remove both $Hg^0$ and $Hg^{2+}$ or $^{1+}$ in order to achieve high removal efficiency in compliance with the relevant regulations. In addition, the mass ratio of $Hg^0$ vs. $Hg^{2+}$ or $^{1+}$ in the contaminated gas stream may change frequently in many real applications. Such variation and uncertainty could pose a major challenge to conventional PAC application for achieving a consistent result. The new sorbent disclosed herein serves to better meet the requirement.

Further, many applications such as mercury emission control in coal-firing boiler flue gas involve removing mercury from a hot gas stream. Physical sorption may be greatly affected as temperature increases. For example, PAC based technology sorption capacity typically decreases significantly if temperature increases from 25° C. to 140° C. In contrast, the efficiency and capacity of the new sorbent barely change with such temperatures. At 140° C., the sorption capacity of the new sorbent could be 1000 times higher than that of the conventional sorbent, Br-PAC.

When using PAC for Hg removal, the captured Hg is bound onto the surface of the spent PAC. Such binding of Hg with carbon surface is not permanent and could be reversed under certain conditions. Under heat treatment, Hg on the PAC could be easily released into the environment, leading to contaminations to water, air, or soils. With the sorbent according to the present invention, the mercury (Hg) is chemically locked within the crystalline structure of $FeO_x$. The mercury (Hg) could not be leached out in any significant level by even a strong acid or base treatment. Similarly, the sorbent can also bear high temperatures of up to 250° C. without releasing Hg.

For coal-fired power plants, the fly ash captured by an electrostatic precipitator (ESP) or baghouse filtration unit is often sold for cement production. When PAC is injected into the flue gas ductwork for Hg control, PAC would be mixed with the boiler fly ash and subsequently captured along with the fly ash downstream. The fly ash with high PAC content could alter the property of the fly ash and become a problem to cement production. The value of PAC-bearing fly ash could be reduced. When the sorbent composition of the present disclosure is used, the application rate would be much smaller than that of conventional PAC due to the superior efficiency of the sorbent according to the present invention. In addition, the sorbent powder is essentially an iron oxide mineral, and its properties are not categorically different from that of fly ash. Henceforth, the presence of a very small amount of sorbent would not change the characteristics of the fly ash and reduce its value as a supplement for cement production on reuse.

The invention is further explained in the following examples, which however, are not to be construed to limit the scope of the invention. In the first section, the methods of using column filtration tests to evaluate the new V-Sorbent capability in Hg removal are described. The results are reported and analyzed in terms of Hg removal efficiency and specific Hg sorption capacity of the new V-Sorbent. Factors that may affect the new V-Sorbent quality and its performance are discussed. In the second section, the methods used to evaluate the chemical and heat stability of the new V-Sorbent and to assess the security of Hg captured by the sorbent are described.

EXAMPLES

Example-1 Evaluation of Mercury Removal Capability of the V-Sorbent

Objective:

To evaluate the specific mercury sorption capacity of the V-Sorbent by conducting a filtration column breakthrough test. The objective is to estimate how much mercury could be effectively captured by the V-Sorbent before the sorbent exhausts, i.e., to determine $C_{Hg}$, which carries a unit of g Hg removed per g V-Sorbent.

Figure 5:
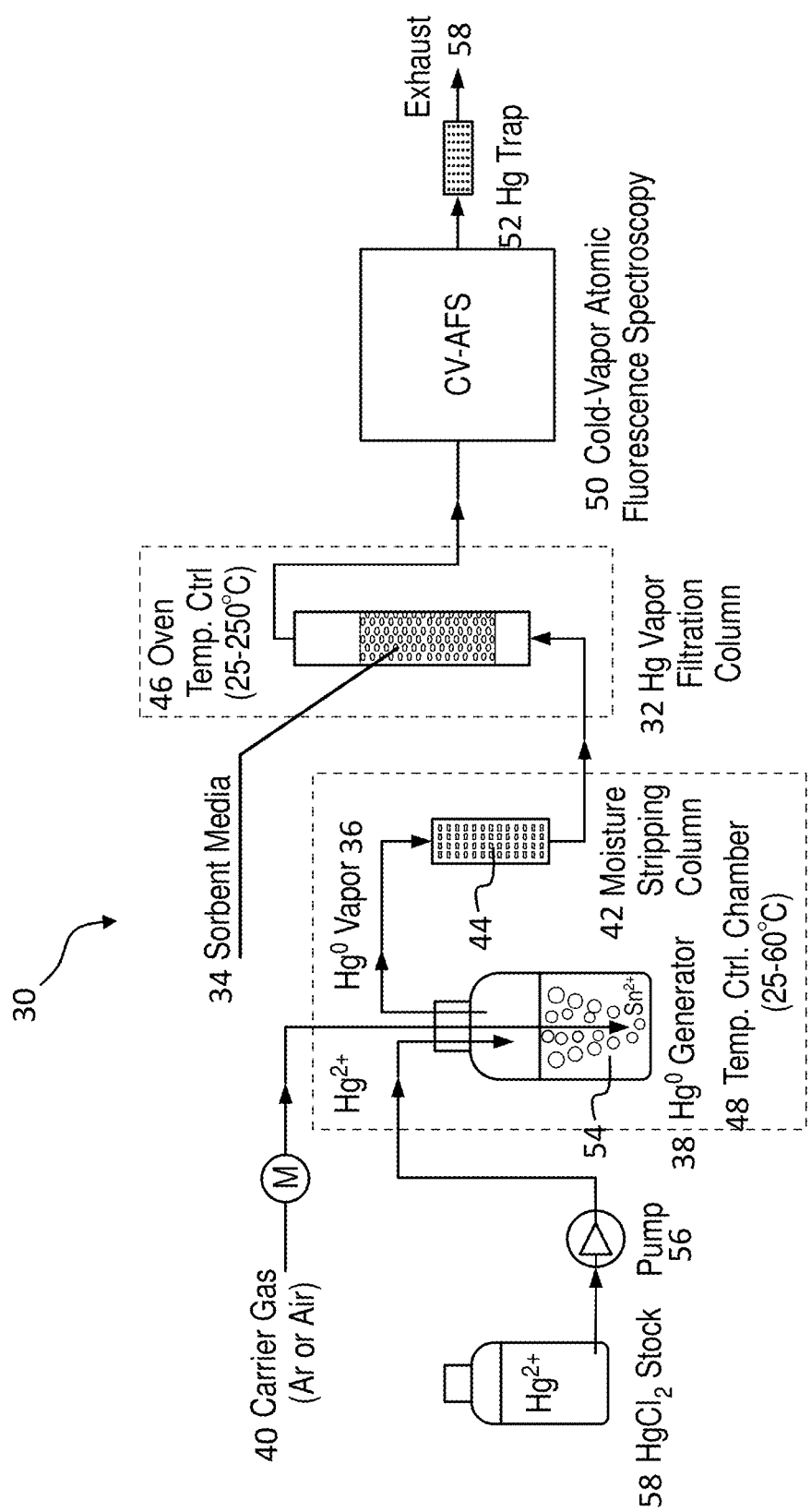
FIG. 5 depicts a schematic of experimental set-up used to evaluate Hg sorption capacity of the sorbent composition according to an embodiment of the present disclosure. The system includes a $Hg^0$ vapor generator, a moisture stripping column (a soda lime-packed bed column), a packed-bed sorbent column in a temp controlled oven, and a CV-AFS for quantifying $Hg^0$ vapor concentration.

Materials and Methods:

Experimental setup of a mercury filtration column. FIG. 5 depicts a schematic of an experimental set-up 30 used to evaluate Hg sorption capacity of the V-Sorbent composition according to an embodiment of the present disclosure. The Hg vapor filtration column 32 is packed with porous media 34 comprising sand grains coated with the new V-Sorbent (here, chemical formulation $Fe^{II}_x Fe^{III}_y Se^{-II}_a O^{-II}_b$). As shown in FIG. 5, the elemental mercury vapor 36 is produced in situ from a mercury vapor generating reactor 38 and carried by an argon gas or air stream 40 at a controlled flow rate, for e.g., 500 mL/min, through a moisture removal column or packed bed column 42 filled with 20 g soda lime pellets 44, and then through a packed-bed sorbent media column 32 for mercury vapor capture. The sorbent column 32 was set up in a temperature controlled oven 46, in which the interior temperature could be controlled between the ambient temperature (about 20° C.) and high temperature of 200° C. When a high concentration mercury vapor (e.g., >5 µg/L) is needed for a test, the $Hg^0$ generator 38 would be transferred into a heated chamber 48 and operated at the elevated temperature of 60° C. that promotes $Hg^0$ volatilization. A cold-vapor atomic fluorescence spectroscopy (CV-AFS) (Brooks Rand) instrument 50 is used to measure mercury concentration in the carrier gas. The Brooks Rand CV-AFS is equipped with a purge-and-trap unit 60 (see FIG. 10) that can help detect mercury at a trace mass of 10 pg ($10^{-12}$ g). For most tests, however, the gas directly flowed through the CV-AFS detector (i.e., the purge-and-trap unit 60 was bypassed). Exhaust 58 exits from the AV-AFS instrument after passing through an Hg trap 52.

Packed Bed Media:

The packed-bed media was prepared by mixing 25 mg of the V-Sorbent powder with 10 grain of clean silica sand in a 20 mL glass column (a glass chromatography column of 15 mm diameter and 100 mm in height). The mixed media were shaken intensively for 3 min to disperse sorbent media and coat the sand grains with a uniform layer of sorbent powder. The white silica sand used was collected between US sieves #30 and #40 (with nominal diameter about 0.3-0.5 mm) and acid washed to cleanse the surface.

$Hg^0$ Vapor Generator:

A 500 mL glass bottle is used as the $Hg^0$ generator. The bottle was prefilled with 300 mL 0.1% $SnCl_2$ solution 54. A Dionex precision piston pump 56 is used to introduce $Hg^{2+}$ 58 of designed concentrations, e.g., 10 mg/L $Hg^{2+}$ (as acidified $HgSO_4$ stock solution), into the reactor bottle (generator 38) at a designed flow rate. When $Hg^{2+}$ mixes with $Sn^{2+}$, $Hg^{2+}$ would be reduced by $Sn^{2+}$ to $Hg^0$. $Hg^0$ in water is volatile and can be flushed out by carrier gas (argon or air) 40 bubbling. The introduction rate of $Hg^{2+}$ solution is controlled within the range of 0.2-1.0 mL/min (or 12-60 mL/h). After an initial few minutes, $Hg^0$ production in liquid phase and $Hg^0$ carry-away through volatilization by carrier gas would reach equilibrium, resulting in a steady stream of gas flow with a known $Hg^0$ vapor concentration. For example, the $Hg^0$ vapor concentration would be 5 µg/L if 10 mg/L $HgSO_4$ is pumped into the reactor at a flow rate of 0.25 mL/min and an air flow rate of 0.5 L/min (10 mg/L×0.25 mL/min÷0.5 L/min=5 µg/L). It has to be noted that the typical Hg concentration in flue gas is on the order of magnitude of 1 to 10 µg/m³, which is about 1/1000 of the concentration used in this sorption capacity test.

Quantification of $Hg^0$ Vapor Concentration by CV-AFS:

The Brooks Rand CV-AFS Hg analyzer system, including both an auto-sampler and a purge-and-trap unit, could detect mercury at picogram ($10^{-12}$ g) level under ideal conditions. High purity argon is the ideal carrier gas that produces high sensitivity for AFS. For this test, depending on test design, either air (most times) or argon was used as the carrier gas. Air can interfere with fluorescence signal and thus reduce the detection limit of the instrument. Nonetheless, when air is used as the carrier gas, the instrument could detect Hg vapor concentration as low as 0.05 µg/L air. At concentrations above 5 µg/L, the CV-AFS detector could be saturated. The reliable range for quantifying the Hg vapor is determined to be 0.1-5.0 µg/L concentration. For general column breakthrough test, using air as the carrier gas is sufficient. When argon gas is used as the carrier gas, the CV-AFS could detect 0.1 ng/L $Hg^0$ vapor, which is three orders of magnitude lower than when air is the carrier gas.

Example-2 Test 1: Mercury Sorption Capacity: New V-Sorbent vs. Br-PAC Media

Objective:

Column A, B, C, and D tests were conducted to evaluate mercury sorption capacity of silica sand, PAC, brominated-PAC, and the V-Sorbent according to the present invention. The purpose is to demonstrate the extraordinary high Hg sorption capacity of the V-Sorbent in comparison with Br-PAC, which is currently considered as the most effective and commercially viable mercury sorbent for industrial application.

Method:

Mercury static sorption capacity is estimated through column filtration breakthrough tests using the experimental setup in FIG. 5. The column filtration tests were conducted under ambient temperature of 25° C. a) Column A served as a control to assess $Hg^0$ sorption by silica sand. The column was packed with 10 g of silica sand; 1 mg/L $Hg^{2+}$ solution was pumped at a rate of 0.5 mL/min; The air flow rate was set at 0.5 L/min. By calculation, the $Hg^0$ generator produced a vapor concentration of 1.0 µg/L (1 µg/mL×0.5 mL/min÷0.5 L/min). b) Column B served to assess $Hg^0$ sorption by conventional PAC media. The column was packed with 10 g of silica sand mixed with 25 mg PAC. $Hg^{2+}$ stock solution of 10 mg/L was pumped at a rate of 0.5 mL/min. The air flow rate was set at 0.5 L/min, producing a vapor concentration of 10 µg/L. Column C was packed with 10 g of silica sand mixed with 25 mg Br-PAC. $Hg^{2+}$ stock solution of 10 mg/L was pumped at a rate of 0.5 mL/min. The air flow rate was set at 0.5 L/min, producing a vapor concentration of 10 µg/L. c) Column C served to assess $Hg^0$ sorption by brominated-PAC media. Br-PAC media is prepared from the same PAC in column B by spraying concentrated NaBr solution on the PAC to a mass ratio of 5% bromine by weight. d) Column D was packed with 10 g of silica sand coated with 25 mg of the new V-Sorbent fine powder. $Hg^{2+}$ stock solution of 20 mg/L was pumped at a rate of 0.5 mL/min. The air flow rate was set at 0.5 L/min, producing a vapor concentration of 20 µg/L. Column D served to assess $Hg^0$ sorption by the new sorbent in comparison with PAC and Br-PAC.

TABLE 2

Summary of column setup and testing conditions and Hg capacity ($C_{Hg}$) in Test 1.

| Test Conditions | Column A | Column B | Column C | Column D |
|---|---|---|---|---|
| Media Bed | 10 g sand only | 25 mg PAC on 10 g sand | 25 mg Br-PAC on 10 g sand | 25 mg V-Sorbent on 10 g sand |
| $Hg^{2+}$ stock solution | 1 mg/L | 10 mg/L | 10 mg/L | 20 mg/L |
| $Hg^0$ vapor conc. | 1.0 μg/L | 10 μg/L | 10 μg/L | 20 μg/L |
| Total column Hg Capacity | <1 μg | 14 μg | 93 μg | 5350 μg |
| Specific sorption capacity, $C_{Hg}$ | 0 | 0.64 μg Hg per mg PAC | 3.7 μg Hg per mg Br-PAC | 214 μg Hg per 1 mg V-Sorbent |

Figure 6:
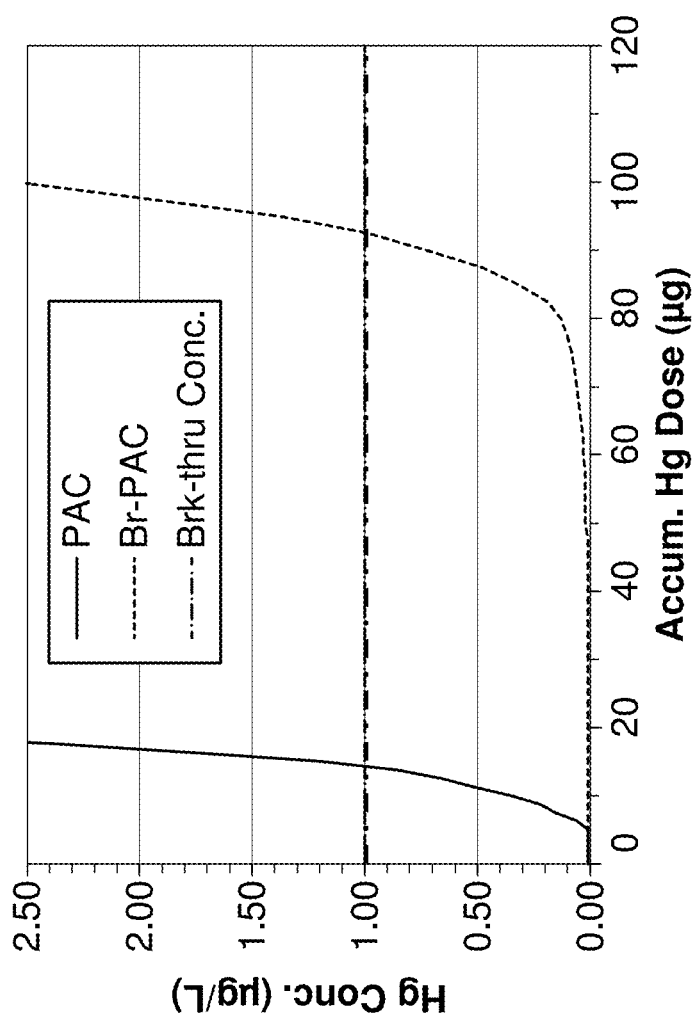
FIG. 6 depicts a mercury sorption capacity curve of a filtration column packed with powdered activated carbon (PAC), and a filtration column packed with Brominated-powdered activated carbon (Br-PAC).
Figure 7:
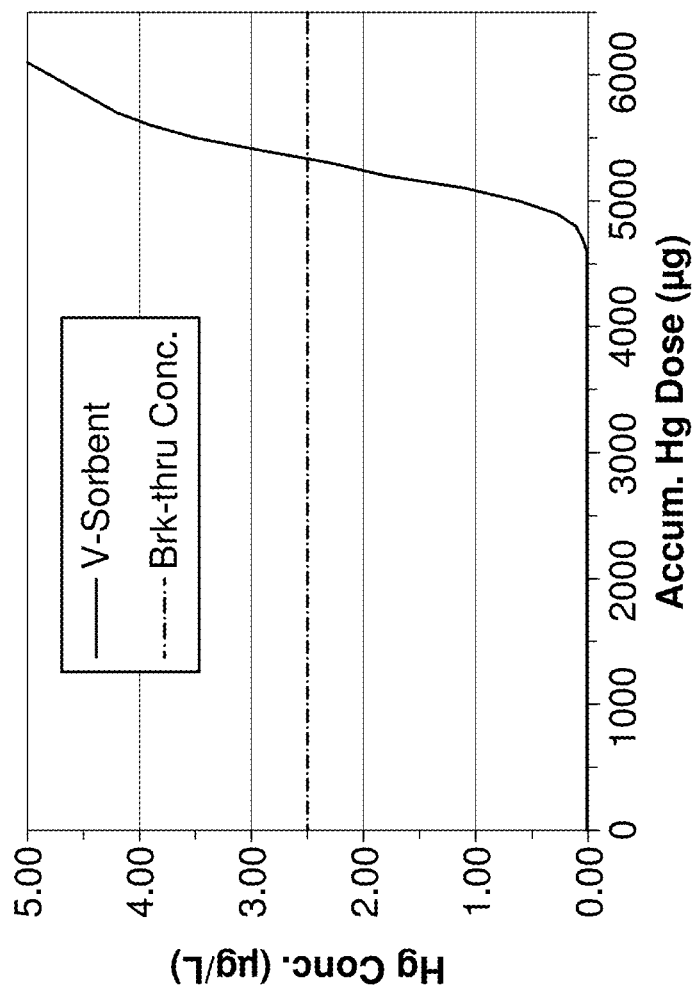
FIG. 7 depicts a mercury sorption capacity curve of the filtration column packed with the sorbent composition.

FIG. 6 and FIG. 7 illustrate $Hg^0$ break-through curves observed in Column Test 1. The columns were packed with 25 mg of powdered activated carbon (PAC, Column-B), brominated (5% Br by wt.) powdered activated carbon (Br-PAC, Column C), and V-Sorbent (Column D) on 10 g sand media. The column test conditions were summarized in Table 2. For this study, the column was considered broken through when the Hg concentration in the filtered gas increases to 10% of the feed flow (e.g., 1 μg/L is for Column B and C, and 2.0 μg/L for Column D). Not shown in FIG. 6 or FIG. 7 is Column A (with 10 g sand grain only) in which an instant breakthrough of Hg was observed.

Results:

In the test with sand grain alone (Column-A), Hg breakthrough occurred instantly, resulting in a negligible Hg sorption capacity ($C_{Hg}$<1 μg/10 g sand). The results showed that clean silica sand is virtually inert for Hg sorption. The column with 25 mg purified PAC on sand grain resulted in a low sorption capacity. Breakthrough occurred in 6 min after 14 μg flux under the test condition. In comparison, brominated-PAC exhibited a much higher Hg sorption capacity, with which a breakthrough did not occur until 37 min, corresponding to $C_{Hg}$=92 μg for 25 mg Br-PAC or a specific sorption capacity of $C_{Hg}$=3.7 μg $Hg^0$/mg sorbent. When the new V-Sorbent was used (Column D), breakthrough occurred only after over $C_{Hg}$=5,300 μg Hg for 25 mg sorbent, or a specific sorption capacity of $C_{Hg}$=212 μg $Hg^0$/mg sorbent.

Findings:

The results from the PAC and Br-PAC column tests are consistent with what is generally known in the literature. PAC is effective in removing ionized Hg ($Hg^{2+}$ or $Hg^+$), but performs poorly for elemental mercury ($Hg^0$) removal. Halogenated-PAC, such as Br-PAC, can greatly enhance $Hg^0$ removal. In general, coal combustion would initially produce elemental mercury. Part of $Hg^0$ might be oxidized in the downstream, thus in the flue gas, both elemental and ionized Hg is present. Application of PAC alone in many cases would not achieve high mercury removal due to the presence of $Hg^0$. More often, industry relies on the use of Br-PAC or Br addition to comply with the Hg emission regulations.

The sorption capacity of the new V-Sorbent is more than 60 times that of the Br-PAC. In fact, the Hg capacity measured by weight reaches as high as 20% of the weight of the new sorbent. According to literature, there were few Hg sorbents reporting a dry sorption capacity of more than 0.5% by weight. A metric ton of the new V-Sorbent in theory could capture over 200 kg Hg. Thus, a few tons of this V-Sorbent would be adequate to capture all Hg for one year for many coal-fired power plants under ideal conditions.

Example-3 Test 2: Effect of New V-Sorbent Mass Concentration in the Filtration Bed on Hg Sorption Capacity Objective:

To evaluate sorption capacity as a function of the V-Sorbent mass concentration in the filtration media bed.

Method:

For this test, the filtration columns were prepared by mixing varying amounts of the V-Sorbent (10, 20, 30 mg) on 10 g sand media. Other test conditions were the same as those used in Column D of Test 1. The V-Sorbent used was also the same as the one in Test 1, which contains about 10% Se by weight.

Figure 8:
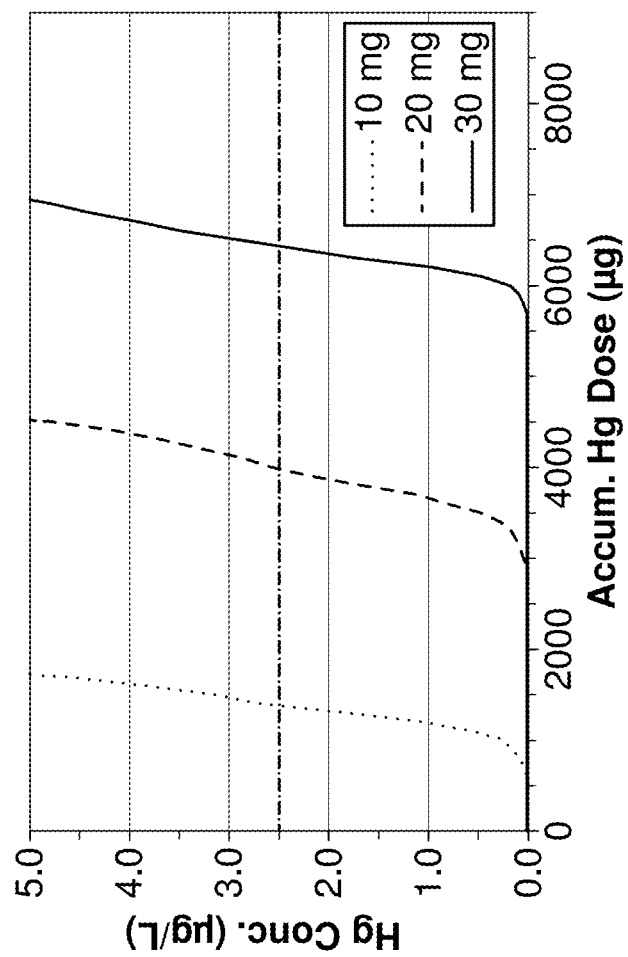
FIG. 8 depicts mercury breakthrough curves through filtration columns packed with varying amounts of the sorbent composition.

Results:

FIG. 8 shows mercury breakthrough curves through the filtration columns with varying amounts of the V-Sorbent. The three columns were packed with 10 g silica sand coated with 10, 20 and 25 mg V-Sorbent A. The columns with 10, 20, and 30 mg V-Sorbent breakthrough occurred after capturing 1340, 3850, and 6320 μg $Hg^0$ respectively. The three column tests demonstrate that the mercury sorption capacity is generally proportional to the concentration of the V-Sorbent on the sand media.

Example-4 Test 3: Effect of Elevated Temperature

Objective:

In this test, the objective was to demonstrate that the V-Sorbent functions well at an elevated temperature environment. In the real application, the flue gas temperature is significantly higher than ambient temperature. For example, in the flue gas system where PAC or Br-PAC media is typically injected to capture Hg, the flue gas temperature is around 130° C.-150° C. Therefore, tolerance of these expected elevated temperatures is essential for the V-Sorbent to be considered commercially viable.

Method:

In this test, the filtration columns were set up in an oven with the temperature controlled at 25° C., 80° C., 140° C., 180° C., or 230° C. Other test conditions were the same as that of Test 1 Column D.

Figure 9:
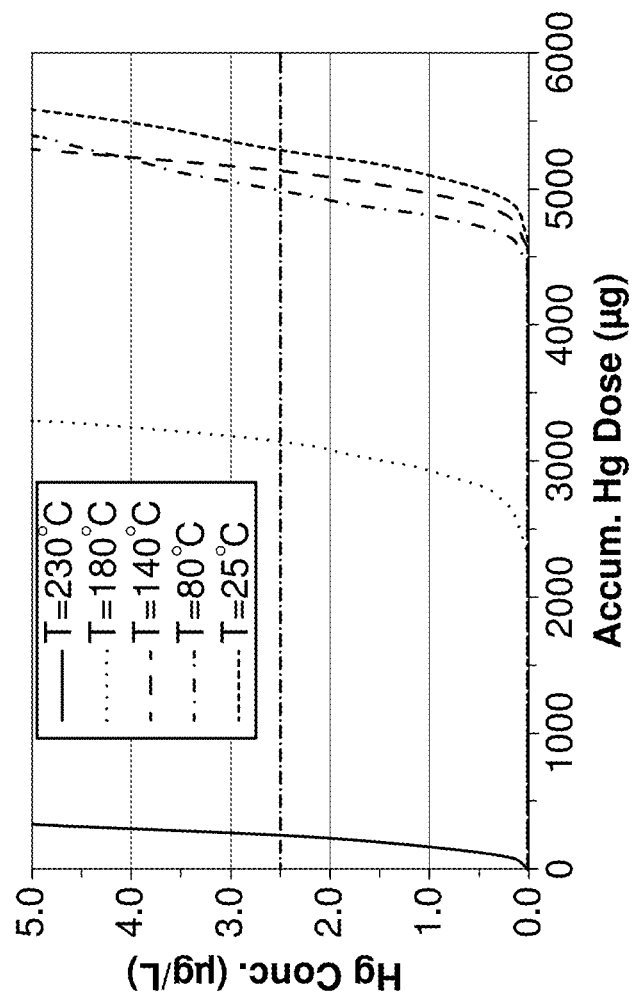
FIG. 9 depicts mercury breakthrough curves through sorbent composition packed filtration column under various operating temperatures.

Results:

FIG. 9 illustrates mercury breakthrough curves through the sorbent filtration columns under various operating temperatures of 25° C., 80° C., 140° C., 180° C., and 230° C. (Test #3). At temperatures below 140° C., varying the temperature has no significant impact on the V-Sorbent's performance with respect to its specific Hg sorption capacity. At temperature 180° C., however, the sorption capacity noticeably decreased when compared with 140° C. At operational temperature 230° C., breakthrough occurred almost instantly, indicating that the V-Sorbent lost most of its sorption capacity when exposed to this temperature. As temperature increased to above 200° C., the original dark brownish color of the V-Sorbent quickly changed to an orange-red color, suggesting a transformation in sorbent material structure and composition. Obviously, such change is detrimental to the mercury sorption capacity for the V-Sorbent.

Implication: The chemical volatility of V-Sorbent at operational temperatures higher than 200° C. may limit its use in applications involving high temperature environments. For coal-fired power plant mercury capture applications, however, the tolerance of 150° C. by the V-Sorbent is adequate for its application in the downstream flue gas system after the air preheating unit. It is widely understood that mercury sorption capacity of Br-PAC and other sorbents may decrease significantly as temperature increases from ambient value to 140° C. Literature reports that Hg sorption capacity decreases by more than 20 times when temperature increases from 30° C. to 140° C. Thus, the V-sorbent has the advantage of tolerating higher temperatures comparatively. Compared to Br-PAC, the V-Sorbent performance is much more stable at elevated temperature. The flue gas passing the selective catalytic reduction unit where NOx is converted to $N_2$ has a temperature as high as 350° C.; therefore, the current V-Sorbent material would not be suitable for application in conjunction with the SCR process in the upstream ductwork before air preheater.

Example-5 Test 4: Impact of Carrier Gas—Air vs. Argon

Objective:

The Tests 1-3 described above used air as the carrier gas, and thus $O_2$ was present when Hg was immobilized by the V-Sorbent. This test examines if $O_2$ is essential for the V-Sorbent material to remove $Hg^0$. Literature reports that the presence of Br on PAC facilitates the oxidation of $Hg^0$ to $Hg^{2+\ or\ 1+}$, which subsequently can be effectively removed by PAC.

Method:

The test was conducted with the same V-Sorbent and also other conditions in Test 1 Column D, except that high purity argon gas is used as the carrier gas (See the Experimental setup in FIG. 5).

Results:

The column test with argon as the carrier gas resulted in high Hg removal with a specific sorption capacity similar to that of Test 1 Column D. The results showed that performance of the V-Sorbent does not depend on the presence of air or oxygen. $Hg^0$ could be directly removed by the V-Sorbent. If oxidation of $Hg^0$ to $Hg^{2+\ or\ 1+}$ was essential for Hg removal by the V-Sorbent, $Fe^{3+}$ in the V-Sorbent would be the most likely oxidant. However, the exact mechanism involved in the V-Sorbent's Hg removal is not yet understood, and would require further testing to elucidate.

Example-6 Test 5: Mercury Capture Efficiency

Objective:

This test is conducted to evaluate the $Hg^0$ capture efficiency of the V-Sorbent. This is to demonstrate that the V-Sorbent not only possesses high capacity for $Hg^0$ capture, but also is capable of reducing $Hg^0$ to an extremely low level.

Figure 10:
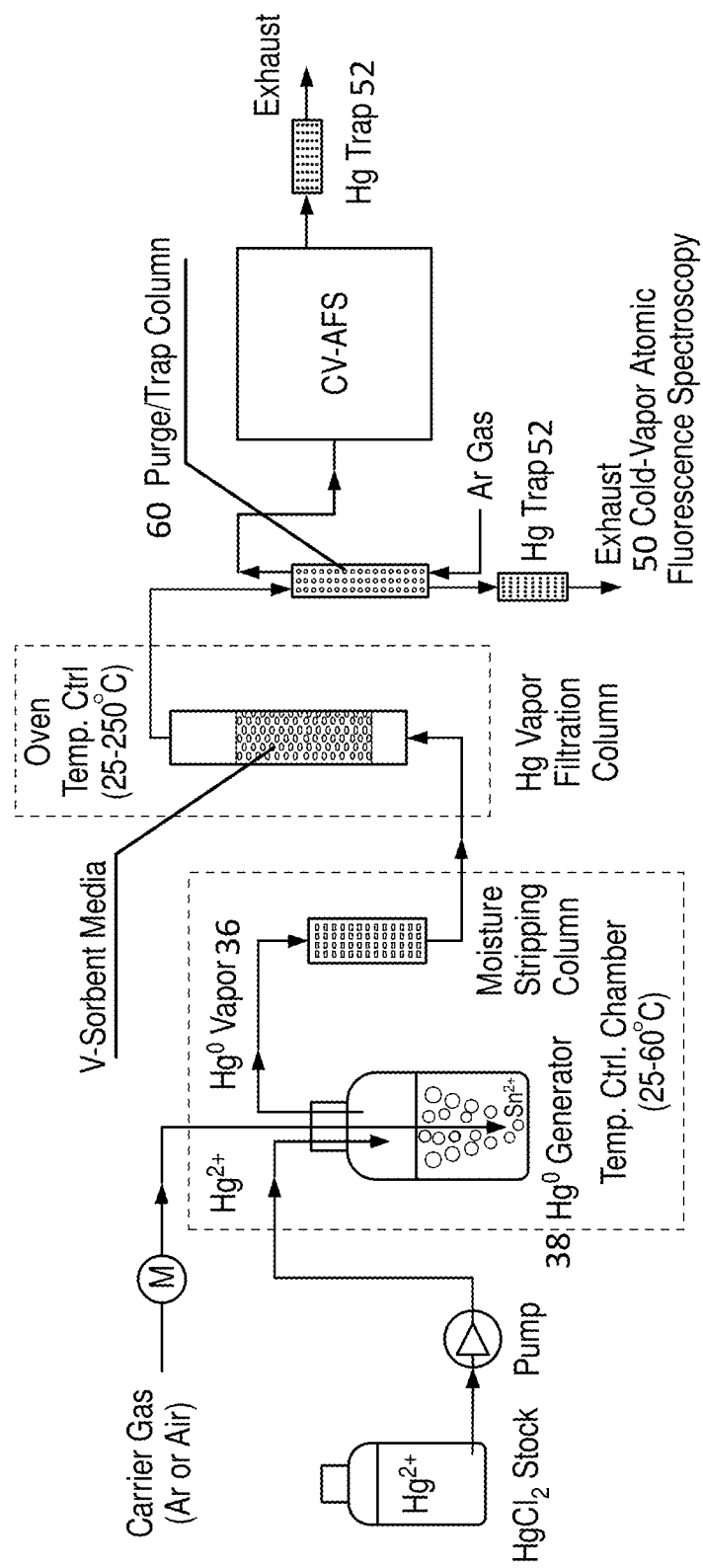
FIG. 10 depicts a schematic of the experimental set up for mercury (Hg) removal efficiency test, according to an embodiment of the present disclosure.

Methods:

Referring back to FIG. 5 and also to FIG. 10 (showing now the purge and trap unit 60), to demonstrate the extremely low $Hg^0$ in the sorbent column treated gas stream, the purge-and-trap unit 60 of the CV-AFS system was connected and turned on. The purge-and-trap unit 60 uses a gold-coated sand column (the trap column) to capture $Hg^0$ in a gas stream at ambient temperature (25° C.) in the purge phase; during the subsequent detection phase, the trap column is heated to release $Hg^0$, which is carried away by Argon gas into the AFS for quantitative analysis. Under a very clean and ideal test environment, the purge-and-trap method can detect as low as 1 pg level Hg. For the test environment of this study, it was found that the method could reliably quantify Hg at a minimum of 10 pg.

FIG. 10 illustrates a schematic of the experimental set up for Hg removal efficiency test similar to that shown in FIG. 5. Here, the purge-and-trap unit 60 is used to capture residual Hg vapor from the sorbent column outflow gas during the purging phase and then heated to release Hg for quantification by the AFS unit 50. For this test, the filtration column 32 was packed with 10 mg sorbent coated on 10 g of silica sand. The $Hg^0$ generator 38 is operated to generate 5 µg $Hg^0$ vapor/L at ambient temp (25° C.) and with a flow rate of 500 mL/min. Argon was used as the carrier gas 40. The $Hg^0$ generator 38 was operated for 10 min in each purge phase and then stopped to initiate the detection cycle to determine how much Hg was captured by the trap column during the purge phase. Upon the end of detection phase, a new purge/detection cycle would begin—for each cycle, a total of 25 µg (A total of 5 liter carrier gas with 5 µg/L).

Results:

The test was conducted for 10 cycles. In each cycle with 25 µg $Hg^0$ dose, $Hg^0$ collected by the trap column was always below the detection limit (<10 pg) of the CV-AFS method. Therefore, the sorbent column $Hg^0$ removal efficiency is higher than 99.9999%. The removal efficiency of $Hg^0$ by the sorbent column is extremely high even under a very short contact time (<1 sec) in the flow through column. The high efficiency suggests high sorption/reaction kinetics between the V-Sorbent and $Hg^0$. It also suggests that the V-Sorbent is likely highly effective in removing $Hg^{2+}$ as $Hg^{2+}$ likely exists at a certain level even though $Hg^0$ dominates in the carrier gas stream flowing through the V-Sorbent column. Conceivably, in the application of dry sorbent injection into the flue gas ductwork, the high sorption/reaction kinetics would help sorbent to capture trace amounts of $Hg^0$ in flight in the complex background of flue gas compositions.

Example-7 Test 6: Removal of $Hg^0$ vs. $Hg^{2+}$

Objective:

In this study, the mercury vapor generator 38 produces elemental mercury vapor in theory. While some $Hg^{2+\ or\ 1+}$ might be directly purged out into the gaseous phase and some of $Hg^0$ could be re-oxidized upon leaving the Hg generator, assumedly $Hg^0$ predominated over $Hg^{2+\ or\ 1+}$. Therefore, all tests above demonstrated the effectiveness of sorbent for $Hg^0$ removal. This test was directed to demonstrating that the V-Sorbent is similarly effective in removing $Hg^{2+\ or\ 1+}$.

Method:

The available Hg analytical setup is not capable of differentiating $Hg^0$ from $Hg^{2+}$. How to generate a gaseous stream with $Hg^{2+\ or\ 1+}$ is not well established in the literature. However, for the purposes of this test, the current best understanding of $Hg^0/Hg^{2+}$ chemistry was used to convert part of $Hg^0$ to $Hg^{2+}$ in the carrier gas to assess how the V-Sorbent performs with respect to $Hg^{2+\ or\ 1+}$ removal. A pre-oxidizing column was installed for the purpose of trying to convert part of $Hg^0$ to $Hg^{2+}$ in the carrier gas before passing through the V-Sorbent column. Two types of pre-oxidizing columns were employed: (1) a bromate-coated silica sand pre-column to oxidize $Hg^0$ vapor; and (2) a spent Br-PAC coated silica sand column that has been saturated with Hg with no significant Hg removal capacity. It is believed according to the literature that Br on PAC could effectively oxidize $Hg^0$ to $Hg^{2+}$. With the installation of a pre-oxidizing column, the objective was to compare how the V-Sorbent performs with respect to removing $Hg^{2+\ or\ 1+}$ vs. $Hg^0$. As a control, a column packed with PAC on sand was used as a comparison to demonstrate the role of the pre-oxidizing column. Except for adding the pre-oxidizing column upstream of the V-Sorbent filtration column, the test conditions were controlled as the same as that of Column D in Test 1.

Results:

With both Br-pretreatment columns, the PAC column increases Hg sorption capacity significantly. The specific sorption capacity for PAC increased from about 0.6 μg Hg per 1 mg PAC to about 2.1 μg Hg per 1 mg PAC with the presence of a pre-oxidizing column. For the V-Sorbent, no significant decrease or increase in Hg sorption was observed with the addition of a pre-oxidizing column. The specific Hg removal capacity is around 204 μg Hg per 1 mg sorbent. These results demonstrate that the V-Sorbent is similarly effective for removing both elemental Hg and $Hg^{2+\ or\ 1+}$.

Implication: The capability of removing both $Hg^0$ and $Hg^{2+\ or\ 1+}$ with high efficiency is a major advantage of the V-Sorbent.

Example-8 Test 7: Mass Transfer Rate and Reaction Kinetics for Hg Sorption

Objective:

This test was conducted to obtain a preliminary estimate of how fast the V-Sorbent media could capture $Hg^0$. In real applications, the contact time between sorbent and Hg vapor could be as short as one second. For a sorbent to remove trace amounts of Hg in such a short time is not a small challenge. Thus, fast mass transfer rate and reaction kinetics are both thought to be essential for the V-Sorbent's viability.

Methods:

A test was designed with a reduced packed bed column to demonstrate that the mass transfer and reaction kinetics involved in using V-Sorbent to remove Hg vapor from a gaseous stream is sufficiently fast for both packed-bed filtration and powder injection applications.

Result Analyses and Discussion:

The contact time between the carrier gas and the sorbent coated media can be estimated. For a column packed with 10 g V-Sorbent coated sand media, the bulk volume is 7.0 cm$^3$ as measured, which includes the true material volume of about 3.78 cm$^3$ and a pore volume of 3.22 cm$^3$, corresponding to a porosity of about 46%. At a gas flow rate of 500 mL/min (8.33 mL/s), it only takes 0.39 second for the carrier gas to pass through the column. Thus on average, Hg vapor has 0.39 second contact time with the media. Test 5 and also Column D test in Test 1 have shown that 0.39 second contact time is sufficient to capture virtually 100% $Hg^0$ for extended duration of operations.

To further demonstrate the fast reaction kinetics of mercury removal, the volume of media bed in the filtration column was reduced to 3 g silica sand mixed with 8 mg V-Sorbent. Under similar conditions (with the carrier gas flow rate at 500 mL/min), the average contact time between gas and sorbent is just 0.12 second. The results showed that Hg vapor of 10 μg/L is 100% removed for extended period of 30 minutes before any noticeable Hg breakthrough.

As the $Hg^0$-bearing gas stream is passing through the filtration bed, $Hg^0$ atoms may have limited chances of colliding onto the media surface to initiate the sorption/reaction chemistry. At a microscopic scale, several factors could determine how efficient Hg could be removed by the sorbent: (1) the opportunities of $Hg^0$ atom contacting with the media surface; (2) the density of effective or reactive sites on the media; (3) the immobilization rate of Hg upon each contact with the reactive sites; and (4) how efficient the surface-bound Hg diffuses into the inner lattice sites of sorbent material. The high removal efficiency of Hg vapor at a contact time as short as 0.1 second demonstrates the high reactivity of V-Sorbent for Hg capture. When V-Sorbent is injected in the form of a powder spraying into a flowing flue gas stream in the ductwork, the V-Sorbent could still be able to capture trace amounts of Hg out of the complex gas compositions. The fast mass transfer/sorption/reaction kinetics demonstrated that the V-sorbent could be effective in both direct powder injection applications and static packed-bed flow through filtration applications.

Example-9 Test 8: Hg Sorption Capacity as a Function of Se Content in the V-Sorbent Objective:

To evaluate the quantitative relationship between the concentration of selenium as the key ingredient in the V-Sorbent and mercury sorption capacity.

Method:

In the V-Sorbent used in Test 1 and Test 2, the mass concentration of selenium in the V-Sorbent material (V-Sorbent A) is about 10%. For these tests, two batches of V-Sorbent were prepared separately with reduced dosage of selenium ingredients (sodium selenate and selenite) in step 3 of the synthesis procedure. It was determined that the products from the modified recipe resulted in V-Sorbent with Se %=5.0% (V-Sorbent B) and 2.5% (V-Sorbent C) by weight. The three media with 10%, 5.0%, and 2.5% Se were then evaluated for their Hg sorption capacity on columns packed with 10 g sand coated with 25 mg V-Sorbent. Other test conditions were the same as those used in Column D of Test 1.

Figure 11:
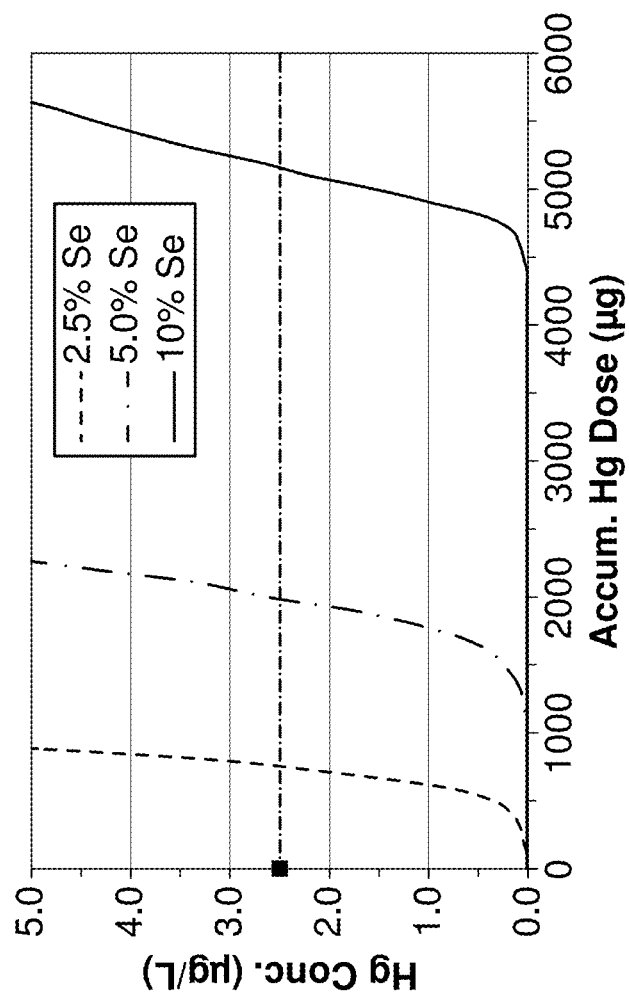
FIG. 11 depicts mercury breakthrough curves observed in a filtration column test with selenium content at differing concentrations.

Results:

FIG. 11 illustrates the mercury breakthrough curves observed in the filtration column tests. The three columns were packed with 25 mg sorbent with 2.5%, 5.0% or 10% Se by weight as the ingredient. The total capacity and the specific Hg capacity are summarized in Table 3.

TABLE 3

Summary of the Results of Test 8.

| Sorbent | Se % by wt. | Column Hg Capacity (µg) | Specific Hg Capacity (µg Hg/mg Sorbent) |
| --- | --- | --- | --- |
| V-Sorbent A | 10% | 4860 | 194 µg Hg/mg Sorbent |
| V-Sorbent B | 5% | 1930 | 77 µg Hg/mg Sorbent |
| V-Sorbent C | 2.5% | 680 | 27.2 µg Hg/mg Sorbent |

The results showed that the 10% Se V-Sorbent has the highest specific sorption capacity for mercury. As Se % content in the V-Sorbent decreases, the Hg sorption capacity decreases faster and at a higher ratio than that of Se % in the V-Sorbent. It has to be noted that the method to determine the capacity in this work, i.e., setting the breakthrough threshold as low as 10% of inflow Hg concentration, does not include all of the available Hg capacity. There is still a significant fraction of Hg sorption capacity that is not used beyond the 10% cut-off threshold. For V-Sorbent C with 2.5% Se, the unused fraction could be significantly larger than that of V-Sorbent A with 10% Se at the time of breakthrough; as a result, the reported specific sorption capacity might be significantly underestimated than one based on the more common practices that use 90% influent concentration as the cut-off threshold. Nonetheless, the results showed that the selenium component in the V-Sorbent plays a central role in capturing gaseous mercury. As additional control tests, four filtration column tests were also conducted separately using ferrous selenide (FeSe) powder, elemental Se powder, pure magnetite ($Fe_3O_4$) or maghemite ($\gamma$-$Fe_2O^3$) powder (all purchased from VWR Scientific as a reagent grade chemical). The columns were packed with 25 mg FeSe powder (or one of the other three media) coated on 10 g silica sand. None of these four media showed any significant $Hg^0$ removal capability, all lower than conventional PAC in term of specific Hg sorption capacity $C_{Hg}$. These additional results suggest that selenide ($Se^{(-II)}$) bonded with $Fe^{(II)}$ alone was not responsible for Hg removal capability of the V-sorbent. It is the unique physicochemical properties attributable to the unique mixed Fe(II)-Fe(III) oxide structure with $Se^{(-II)}$ embedded that contribute to the extraordinary Hg removal capability for the V-sorbent. Based on these tests results, it is projected that the range of Se % could be varied from about 1% to about 20% with a preferred range from about 2.5% to about 10%.

Example-10 Test 9: Mixed Media of PAC with V-Sorbent at 20%, 10%, 5% wt

Objective:

In this test, the compatibility of V-Sorbent with the traditional PAC media was evaluated. Currently, PAC and Br-PAC are commonly used in the form of direction powder injection into the flue gas duct to capture gaseous Hg for Hg emission compliance in the coal-fired power industry. Here, the feasibility of mixing PAC with V-Sorbent, to replace Br-PAC as the non-halogenated sorbent for industrial use, was assessed. This test seeks to evaluate how the mixed PAC and V-Sorbent performs vs. Br-PAC in mercury capture, and in particular, to verify if the effectiveness of the V-Sorbent could be disabled by the presence of PAC.

Method:

For this test, 7.5 g PAC was mixed with 2.5 g V-Sorbent in a high speed mixer to produce the desired 25% wt. of mixed media. Similar mixing of 9.0 g PAC+1.0 g V-Sorbent; and 9.5 g PAC+0.5 g V-Sorbent was performed to make 10% wt. and 5% mixed media, respectively. The V-Sorbent (V-Sorbent A with 10% Se by weight) was used. Other test conditions were controlled as using 3.0 mg/L $Hg^{2+}$ stock solution pumping at a rate of 0.5 mL/min into the $Hg^0$ generator and purged with argon at 0.5 L/min to produce a 3.0 µg/L $Hg^0$ gas stream.

Results:

This test showed that PAC is compatible with the V-Sorbent. The mixed media demonstrate an improved sorption capacity for removing $Hg^0$ vapor in comparison with PAC alone. The overall sorption capacity, however, is lower than that of V-Sorbent alone reported in Test 2. The experimental setup and method, however, may not fully demonstrate the full capacity of the V-Sorbent due to the low mass concentration of V-Sorbent (5.0, 2.5, and 1.25 mg sorbent on 10 g silica sand bed in the three columns, respectively) and the resulting reaction kinetics constraining the overall mercury removal.

Figure 12:
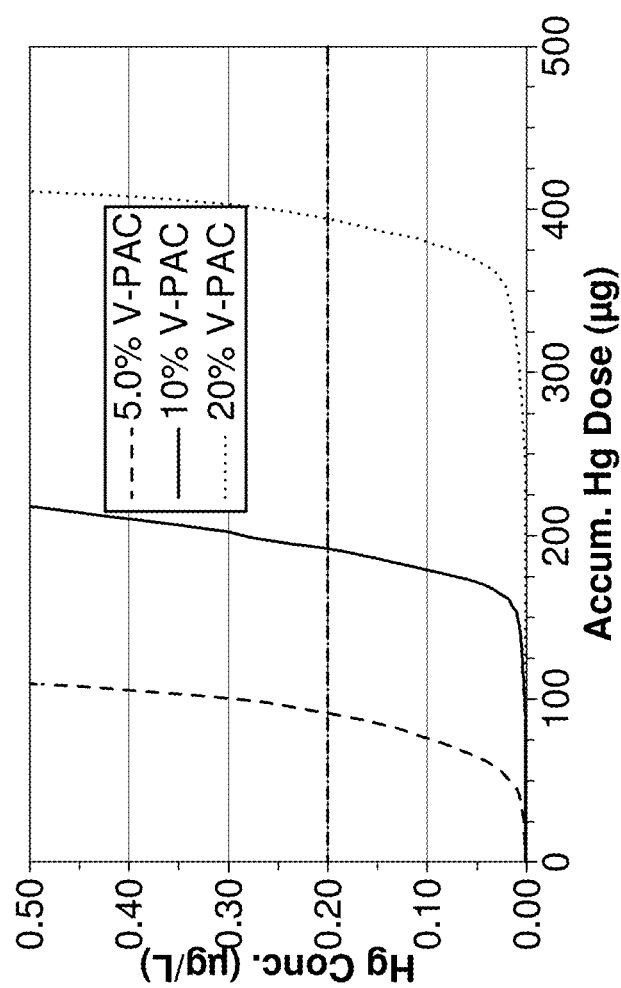
FIG. 12 depicts mercury breakthrough curves observed in a filtration column packed by mixed media of PAC with the sorbent composition at differing concentrations.

FIG. 12 illustrates mercury breakthrough curves through the filtration columns packed by 10 g sand grains coated with 25 mg of mixed PAC and V-Sorbent media. The media mixture was made up of 5% V-Sorbent+95% PAC by weight (5.0% V-Sorbent-PAC), 10% sorbent+90% PAC (10% V-Sorbent-PAC), and 20% V-Sorbent+80% PAC (20% V-Sorbent-PAC).

Discussion:

The V-Sorbent material is effective for removing both elemental $Hg^0$ and ionized $Hg^{2+\ or\ 1+}$. PAC is effective only for removing $Hg^{2+\ or\ +}$, but not $Hg^0$. Since both $Hg^{2+\ or\ 1+}$ and $Hg^0$ are present in most flue gas, the use of mixed V-Sorbent and PAC media would improve the overall removal efficiency—$Hg^0$ being removed by the V-Sorbent while both PAC and V-sorbent contributing to $Hg^{2+\ or\ +}$ removal. In this column test, however, the mercury vapor is present in form of $Hg^0$ only, thus PAC contributed little to the overall Hg capture. It would be ideal if $Hg^0$ could be oxidized by V-sorbent to become $Hg^{2+\ or\ 1+}$ and thus captured by PAC, but that potential will require additional tests to prove or disapprove (see below).

Example-11 Test 10: Mixture of V-Sorbent with Various Inert Media Carriers

Objective:

This test was designed to evaluate the possibility of mixing V-Sorbent fine particles with selected inert powder materials as a new mixed media for powder injection applications. The V-Sorbent material has an extremely high sorption capacity. When used in powder injection, due to its short contact time, much of its sorption capacity is not fully used. The injection rate could be much smaller than that of the PAC injection rate. As such, it might be desirable to dilute the V-Sorbent with certain inexpensive carrier media for injection applications.

Approach:

In this test, several inert media were used as carrier media to dilute the V-Sorbent. The inert materials tested included: kaolinite clay powder (<5 µm), the sieved bottom ash collected from a coal-burning stove (<45 µm in particle diameter), and the diatom earth powder (used as filtration support for a swimming pool filtration tank) (<20 µm). Various ratios of V-Sorbent vs. inert powder were controlled as 10%-50% for these tests.

Results:

The results showed that the mixed V-Sorbent/inert media still possessed good mercury removal capacity and overall efficiency. However, the packed-bed filtration column is not very ideal to evaluate the effectiveness of this mixed media. In fact, it is anticipated that the overall removal efficiency could decrease when compared to a column coated with a similar amount of the V-Sorbent without the inert carrier powder. The decrease of overall removal capacity and efficiency is expected: the density of effective surface or sites has been diluted with the mixture of inert powder; with the co-presence of a large quantity of inert carrier powder, some of the V-Sorbent particles could be blocked by or encapsulated within the inert carrier powder, thus reducing the chance of direct contact between the V-Sorbent and the Hg atoms in the gas stream.

Example-12 Test 11: Removing Mercury Vapor in Real Flue Gas

Objective:

This test was designed to evaluate if various constituents such as $CO_2$, CO, $SO_2$, $NO_x$, $SO_3$, HCl and $H_2O$ moisture in a real flue gas would affect the mercury removing efficiency and capacity of the V-Sorbent.

Figure 13:
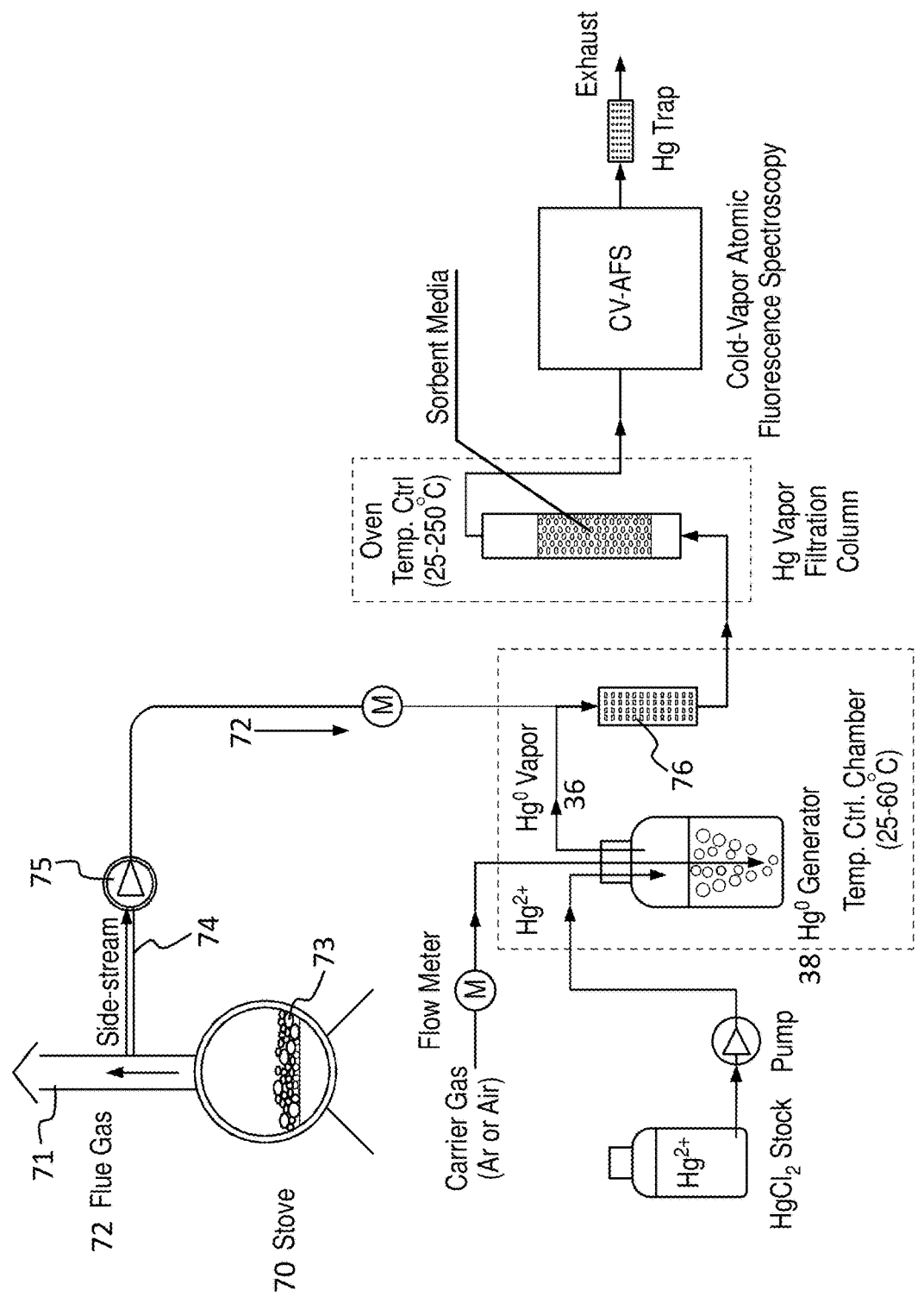
FIG. 13 depicts a schematic of the experimental set up employed to evaluate the efficiency and capacity of the sorbent composition filtration column for removing mercury vapor from a flue-gas stream.

Methods:

Referring now to FIG. 13 in connection with FIG. 5, in this test, a small coal-burning stove 70 was set up to generate flue gas 72. A small side stream 74 of flue gas 72 was pumped (via pump 75) out from the stove exhaust pipe 71 to mix with a mercury vapor stream 36 from the $Hg^0$ generator 38. Three types of coal 73 including anthracite, bituminous, and lignite coal were obtained and sourced for this test. In addition, sulfur pellets were added into the stove 70 during the test to purposely increase $SO_x$ concentrations in the flue gas. The oven was heated up to 140° C. to simulate real operational temperature in the flue-gas ductwork where the V-Sorbent powder injection typically occurs for power plant Hg emission control.

For this test, the flue gas was pumped at a rate of about 400 mL/min. $Hg^0$ generator was operated with air as the carrier gas to generate a concentration of mercury vapor of 20 μg/L at a flow rate of 100 mL/min. A sand/glass fiber filtration column 76 is used to filter out particulate matter of the flue gas to prevent fly ash, or other particulate matter from entering the sorbent column and the cold vapor atomic fluorescence spectroscopy CV-AFS system. Mercury vapor concentration was estimated as 4.0 μg/L in the combined gas stream that flowed through the V-Sorbent filtration column. Note that no effort is taken to remove $H_2O$ moisture before the sorbent filtration column in this test. The sorbent column is packed with 10 g of silica sand coated with 25 mg V-Sorbent A (10% Se). The test with the stove flue gas lasted for 1 hr before stopping the flue gas pump. The sorbent column was then continuously operated with the $Hg^0$ generator only like Test 1 Column D until final breakthrough.

Results:

The V-Sorbent system is operated to treat the flue gas 72 for 1 hr. A total of 120 μg Hg was fed into the sorbent column 32. During the 1-hour test time, no Hg was detected in the filtration effluent (<0.05 μg/L). Upon stopping the flue gas pumping, the sorbent column continued to remove Hg efficiently and the breakthrough did not occur until a total of 3640 μg Hg (±482 μg based on triplicate tests) passed through the column. The test with real flue gas demonstrates that the V-Sorbent can effectively remove Hg in the backdrop of a complexed gas composition. The common compositions in the flue gas typically include $CO_2$, CO, $SO_2$, NOx, HCl, $H_2O$, and potentially $SO_3$, and the V-Sorbent material still functions effectively in the presence of all of these gases. Upon the exposure to the flue gas, it appears that the overall Hg capacity decreased to some degree from about 5000 μg as expected to about 3640 μg. The mechanism and chemistry behind this decrease is not clear, but it is conceivable that either some of the Hg capacity is consumed to remove non Hg impurity in the gas phase or the V-Sorbent surface is altered and lost some of its sorption capacity. Regardless of the specific mechanisms involved, the results nonetheless illustrate that the V-sorbent material is highly effective in removing Hg vapor from a complex flue gas stream.

Example-13 Evaluation of the Stability of the Spent Sorbent Media with Captured Hg Wet Chemistry Leaching Studies:

Objective:

The potential of secondary release of Hg into air or water from any spent sorbent media is a major concern for many applications. This test was therefore conducted to determine whether the spent V-Sorbent media (containing captured Hg) could release (leach) Hg or Se into water under neutral, alkaline (basic), or acidic conditions.

Method:

1) Preparation of spent sorbent media with Hg. A column filtration was prepared as 25 mg V-Sorbent A (with 10% Se content) coated on 10 g sand, which was then used to treat Hg-bearing air at 25° C. A total of 4.0 mg $Hg^0$ vapor was passed through the column, and the Hg which was completely captured by 25 mg sorbent as expected. The 10 g silica sand with 25 mg V-Sorbent and 4 mg captured Hg was transferred into a 25 mL serum vial. In total, 4 sets of serum (test) vials were prepared for conducting leaching tests under different conditions. 2) In Serum vial A, 20 mL DI water was added. The serum vial was then shaken for 24 hr. The solute was then sampled and analyzed for total Se and Hg. 3) In Serum Vial B, 20 mL 0.1 M acetate acid was added. The pH of the mixture was about 4.6. After mixing for 24 hr, the solute was sampled and analyzed for total Se and Hg. 4) In Serum Vial C, 20 mL 0.1 M HCl was added. The pH of the mixture was about 1.0. After mixing for 24 hr, the solute was sampled and analyzed for total Se and Hg. 5) In Serum vial D, 20 mL 0.1 M NaOH was added. The pH of the mixture was about 13. After mixing for 24 hr, the solute was sample and analyzed for total Se Hg.

TABLE 4

Leaching Test Results

| Test Vial | Extracting Solute | pH | Hg Conc. (μg/L) | Hg % leached | Se Conc. (μg/L) | Se % leached |
|---|---|---|---|---|---|---|
| A | DI water | 7.4 | <0.01 | 0 | <1 μg/L | 0 |
| B | 0.1M Acetate Acid | 4.6 | <0.01 | 0 | <1 μg/L | 0 |
| C | 0.1M HCl | 1.0 | 0.3 | 0.00015% | 32 μg/L | 0.026% |
| D | 0.1M NaOH | 13.0 | <0.01 | 0 | <1 μg/L | 0 |

Notes: (1) For Vial C with 0.1 M HCl, a total of 6 ng was leached, out of a total of 4.0 mg Hg in the sample; thus a tiny fraction of 6 ng out of 4 mg; thus a tiny fraction of 0.00015% was leached after 24 hr acid treatment. (2) For Vial C treated with 0.1 M HCl, a total of 0.64 ug Se was leached out of a total of 2.5 mg Se in the sorbent media. 0.026% of Se was leached after 24 hr acid treatment.

The above results showed that even with strong acid treatment at pH=1, only a minuscule fraction of Se and Hg in the spent V-Sorbent sample was leached out. Under basic (alkaline) conditions, no leaching was observed of either Se or Hg. These results demonstrate the chemical stability of the spent V-Sorbent material containing captured Hg. The 0.1 M HCl treatment is harsher than the leaching conditions defined by the toxicity characteristic leaching procedure ("TCLP") protocol. As such, the spent V-Sorbent media appears eligible for disposable as a non-hazardous material. The spent V-Sorbent media does not appear to pose any significant risk to the environment in terms of heavy metal leaching.

Heat Treatment Stability Studies:

Objective:

To test the stability of Hg in the spent V-Sorbent media as a function of applied heat.

Method:

1) The procedure described above was also used to prepare a filtration column with 25 mg spent sorbent and 4.0 mg Hg captured. 2) The filtration column was heated in the oven set at 150° C. while the column was continuously purged with argon gas at 500 mL/min. The outflow argon was analyzed with CV-AFS to quantify Hg concentration; 3) oven temperature was further increased to 230° C. The column was continuously purged with argon gas at 500 mL/min. The outflow argon was analyzed with CV-AFS to quantify Hg concentration.

Results:

At both 150° C. and 230° C. heat treatment, Hg vapor in the purge gas was not detectable (<0.001 µg/L). This indicates that mercury captured in the spent V-Sorbent is highly stable under elevated temperatures. At 230° C., the V-Sorbent might become chemically altered as suggested by the color change noted above. However, even though the V-Sorbent has lost further Hg removal capability, the Hg previously captured appears to remain locked within the V-Sorbent.

All references referred to herein are incorporated herein by reference. While the composition, systems and methods herein have been described in terms of preferred or illustrative embodiments, it will be apparent to those of skill in the art that variations may be applied to the composition, processes and systems described herein without departing from the concept and scope of the invention. All such similar substitutes and modifications apparent to those skilled in the art are deemed to be within the scope and concept of the invention. Those skilled in the art will recognize that the composition and methods of the present disclosure have many applications, and that the present disclosure is not limited to the representative examples disclosed herein. Moreover, the scope of the present invention covers conventionally known variations and modifications to that described herein, as would be known by those skilled in the art.

I claim:

1. A method for producing an Iron-Selenide-Oxide sorbent composition for removing mercury vapor from a gaseous stream, comprising the steps of:
   A. preparing in a reaction vessel employing a combination of mixing and aeration a base ferrous or ferric oxide ($FeO_x$) media comprising a non-stoichiometric mixed Fe(II)-Fe(III) iron oxide, the $FeO_x$ media having a lattice structure,
   B. conditioning the base $FeO_x$ media formed in Step A by mixing it into a aqueous slurry of ferrous selenite ($FeSeO_3$) and ferrous selenate ($FeSeO_4$) in a conditioning reactor to form a conditioned mixture,
   C. reducing the conditioned mixture formed in Step B by mixing an elemental iron ($Fe^0$) powder into the conditioned mixture to result in the incorporating of the selenide into the $FeO_x$ media lattice to create a slurry comprising a mixed $Fe^{(II)}/Fe^{(III)}$—$Se^{(-II)}$—$O^{(-II)}$ crystalline structural material, and
   D. dewatering and oxidizing the Fe—Se—O material to produce the sorbent composition in a powdered form.

2. The method of claim 1, wherein Step A further comprises mixing deionized water, $FeCl_2 \cdot 4H_2O$, and NaOH to form a precipitate per the reaction: $Fe^{2+} + OH^- \rightarrow Fe(OH)_2$ precipitate, wherein the initial stage of the mixture comprises a pH of about 11.80 and a mostly white colored precipitate, and wherein the aeration is moderated to drive an oxidation reaction to form a mostly black precipitate known as magnetite ($Fe_3O_4$) or maghemite ($\gamma$-$Fe_2O_3$) or a mixture of both, following the equations: (1) $6Fe(OH)_2 + O_2 \rightarrow 2Fe_3O_4 + 6H_2O$; or (2) $4Fe(OH)_2 + O_2 \rightarrow 2Fe_2O_3 + 4H_2O$.

3. The method of claim 1, wherein the ratio of Fe(III) to Fe(II) is 1.0:0.5 at Step A.

4. The method of claim 1, wherein the mixed Fe(II)-Fe(III) iron oxide at Step A comprises $Fe^{(III)}_{1.0}Fe^{(II)}_{0.7}O^{(-II)}_{2.2}$.

5. The method of claim 1, wherein the conditioning reactor in the conditioning Step B has an internal headspace that is flushed with and maintained under an inert gas to create an oxygen-free environment.

6. The method of claim 1, wherein the pH at the end of conditioning Step B is between 9.0 and 9.5.

7. The method of claim 1, wherein the Fe—Se—O crystalline structural material formed in Step C comprises $Fe^{(III)}_{1.0}Fe^{(II)}_{2.5}Se^{(-II)}_{0.366}O^{(-II)}_{3.63}$.

8. The method of claim 1, wherein the slurry formed in Step C further comprises salt residues, and wherein Step D further comprises washing the slurry produced from Step C to remove the salt residues.

9. The method of claim 8, wherein the washing comprises one or more cycles of settling, supernatant decanting or deionized (DI) water rinsing.

10. The method of claim 8, wherein the washing comprises filter pressing the slurry, decanting or deionized (DI) water rinsing.

11. The method of claim 1, wherein Step D further comprises drying the slurry to produce the powdered sorbent composition.

12. The method of claim 11, wherein the drying process is performed using an oven.

13. The method of claim 11, wherein the drying process is performed using a spray dryer.

14. The method of claim 1, wherein the sorbent composition is $Fe^{(III)}_a Fe^{(II)}_b Se^{(-II)}_x O^{(-II)}_y$.

15. The method of claim 14 wherein the ratio of a to b depends on the oxidation process, and the value of x depends on the amount of the selenium.

16. The method of claim 14 wherein the sorbent composition comprises iron (Fe) ranging from 60% to 70%, selenium (Se) ranging from 2.5% to 10%, and oxygen (O) ranging from 20% to 30%.

17. An iron-selenide-oxide composition formed by the method of:
   A. preparing in a reaction vessel employing a combination of mixing and aeration a base ferrous or ferric oxide ($FeO_x$) media comprising a non-stoichiometric mixed Fe(II)-Fe(III) iron oxide, the $FeO_x$ media having a lattice structure,
   B. conditioning the base $FeO_x$ media formed in Step A by mixing it into a aqueous slurry of ferrous selenite ($FeSeO_3$) and ferrous selenate ($FeSeO_4$) in a conditioning reactor to form a conditioned mixture, C. reducing the conditioned mixture formed in Step B by mixing an elemental iron (Fe⁰) powder into the conditioned mixture to result in the incorporating of the selenide into the $FeO_x$ media lattice to create a slurry comprising a mixed Fe—Se—O crystalline structural material, and D. dewatering and oxidizing the Fe—Se—O material to produce the sorbent composition in a powdered form.

18. The composition of claim 17, wherein method Step A further comprises mixing deionized water, $FeCl_2 \cdot 4H_2O$, and NaOH to form a precipitate per the reaction: $Fe^{2+}+OH^-\rightarrow Fe(OH)_2$ precipitate, wherein the initial stage of the mixture comprises a pH of about 11.80 and a mostly white colored precipitate, and wherein the aeration is moderated to drive an oxidation reaction: $4Fe(OH)_2+O_2\rightarrow 4\gamma\text{-}FeOOH+2H_2O$ to form a mostly black precipitate known as magnetite, following the equation:

$$6Fe(OH)_2+O_2\rightarrow 2Fe_3O_4+6H_2O.$$

19. The composition of claim 17, wherein the ratio of Fe(III) to Fe(II) is 1.0:0.5 at Step A.

20. The composition of claim 17, wherein the mixed Fe(II)-Fe(III) iron oxide at Step A comprises $Fe^{(III)}_{1.0}Fe^{(II)}_{0.7}O^{(-II)}_{2.2}$.

21. The composition of claim 17, wherein the conditioning reactor in the conditioning Step B has an internal headspace that is flushed with and maintained under an inert gas to create an oxygen-free environment.

22. The composition of claim 17, wherein the pH at the end of conditioning Step B is between 9.0 and 9.5.

23. The composition of claim 17, wherein the Fe—Se—O crystalline structural material formed in Step C comprises $Fe^{(III)}_{1.0}Fe^{(II)}_{2.5}Se^{(-II)}_{0.366}O^{(-II)}_{3.63}$.

24. The composition of claim 17, wherein the slurry formed in Step C further comprises salt residues, and wherein Step D further comprises washing the slurry produced from Step C to remove the salt residues.

25. The composition of claim 24, wherein the washing comprises one or more cycles of settling, supernatant decanting or deionized (DI) water rinsing.

26. The composition of claim 24, wherein the washing comprises filter pressing the slurry, decanting or deionized (DI) water rinsing.

27. The composition of claim 17, wherein Step D further comprises drying the slurry to produce the powdered sorbent composition.

28. The composition of claim 27, wherein the drying process is performed using an oven.

29. The composition of claim 27, wherein the drying process is performed using a spray dryer.

30. The composition of claim 17, wherein the sorbent composition is $Fe^{(III)}_a Fe^{(II)}_b Se^{(-II)}_x O^{(-II)}_y$.

31. The composition of claim 30 wherein the ratio of a to b depends on the oxidation process, and the value of x depends on the amount of the selenium.

32. The composition of claim 30 wherein the sorbent composition comprises iron (Fe) ranging from 60% to 70%, selenium (Se) ranging from 2.5% to 10%, and oxygen (O) ranging from 20% to 30%.

33. The composition of claim 17 further comprising a powdered activated carbon (PAC) material, the method further comprising the step of mixing the PAC with the powdered sorbent to create a mixture of powdered iron-selenide-oxide and PAC.

34. A method of using an Iron-Selenide-Oxide sorbent composition formed by the method of claim 1 for removing mercury vapor from a gaseous stream, comprising the steps of directly injecting a powdered form of the sorbent composition into the mercury-containing gaseous stream.

35. The method of claim 34, wherein the Iron-Selenide-Oxide sorbent composition further comprises iron in forms of both Fe(III) and Fe(II) oxidation state and Se in form of Se(-II).

36. The method of claim 34 wherein the sorbent composition is injected into the mercury-containing gaseous stream at a concentration range of 1 mg/m³ to 100 mg/m³ gas.

37. A method for producing an Iron-Selenide-Oxide sorbent composition for removing mercury vapor from a gaseous stream, comprising the steps of:

A. preparing in a reaction vessel employing a combination of mixing and aeration a base ferrous or ferric oxide ($FeO_x$) media comprising a non-stoichiometric mixed Fe(II)-Fe(III) iron oxide, the $FeO_x$ media having a lattice structure, B. conditioning the base $FeO_x$ media formed in Step A by mixing it into a aqueous slurry of ferrous selenite ($FeSeO_3$) and ferrous selenate ($FeSeO_4$) in a conditioning reactor to form a conditioned mixture, C. reducing the conditioned mixture formed in Step B by mixing an elemental iron (Fe⁰) powder into the conditioned mixture to result in the reduction of selenite ($Se^{IV}$) and selenate ($Se^{VI}$) ions to become selenide ($Se^{-II}$) and then the incorporating of the selenide into the $FeO_x$ media lattice to create a slurry comprising a mixed $Fe^{(II)}/Fe^{(III)}$—$Se^{(-II)}$—$O^{(-II)}$ crystalline structural material, and D. dewatering and oxidizing the mixed $Fe^{(II)}/Fe^{(III)}$—$Se^{(-II)}$—$O^{(-II)}$ material to produce the sorbent composition in a powdered form.

\* \* \* \* \*